Dec. 26, 1950 G. W. COOK 2,535,043

WAVE ANALYZER

Filed Jan. 27, 1943 9 Sheets-Sheet 1

INVENTOR.
GEORGE W. COOK
BY
[signature]

Dec. 26, 1950 G. W. COOK 2,535,043

WAVE ANALYZER

Filed Jan. 27, 1943 9 Sheets-Sheet 2

INVENTOR.
GEORGE W. COOK
BY

Dec. 26, 1950

G. W. COOK 2,535,043

WAVE ANALYZER

Filed Jan. 27, 1943

9 Sheets-Sheet 3

INVENTOR.
GEORGE W. COOK

BY [signature]

Dec. 26, 1950 G. W. COOK 2,535,043

WAVE ANALYZER

Filed Jan. 27, 1943 9 Sheets-Sheet 4

INVENTOR.
GEORGE W. COOK

BY

Dec. 26, 1950 G. W. COOK 2,535,043

WAVE ANALYZER

Filed Jan. 27, 1943 9 Sheets-Sheet 5

INVENTOR.
GEORGE W. COOK

BY [signature]

Dec. 26, 1950 G. W. COOK 2,535,043

WAVE ANALYZER

Filed Jan. 27, 1943 9 Sheets-Sheet 6

INVENTOR.
GEORGE W. COOK

BY [signature]

Dec. 26, 1950 G. W. COOK 2,535,043

WAVE ANALYZER

Filed Jan. 27, 1943 9 Sheets-Sheet 7

INVENTOR.
GEORGE W. COOK
BY [signature]

Dec. 26, 1950 G. W. COOK 2,535,043
WAVE ANALYZER
Filed Jan. 27, 1943 9 Sheets-Sheet 8

INVENTOR.
GEORGE W. COOK
BY
[signature]

Dec. 26, 1950 G. W. COOK 2,535,043

WAVE ANALYZER

Filed Jan. 27, 1943 9 Sheets-Sheet 9

INVENTOR.
GEORGE W. COOK

BY [signature]

Patented Dec. 26, 1950 2,535,043

UNITED STATES PATENT OFFICE 2,535,043

WAVE ANALYZER

George W. Cook, Washington, D. C.

Application January 27, 1943, Serial No. 473,711

19 Claims. (Cl. 250—27)

(Granted under the act of March 3, 1883, as amended April 30, 1928; 370 O. G. 757)

This invention is in wave analyzers. As herein described and shown, it is intended to operate in substantially the audio frequencies only, but it will be obvious that in principle it is not thus limited.

In operation, it rapidly resolves and indicates the intensities of sounds simultaneously in a series of selected frequencies originating in a complex sound source. More accurately, its readings, which are proportional to acoustical pressure, must be squared if quantities indicating intensity strictly are desired.

The difficulties involved in mathematical and mechanical analyses of complex wave forms have stimulated the development of electronic analyzers. The prior art devices, generally speaking, are of two types.

One type involves the use of a single highly selective band-pass filter. A voltage corresponding to the wave form of the sound being studied is heterodyned with a search tone and applied to the filter. An analysis is obtained as the search tone varies in frequency. This type of analyzer is well known and widely used, but is subject to limitations in speed of analysis and resolving power. One common type requires about ninety seconds to complete an analysis extending continuously through the audible region. It is evident that this type of analyzer is useful only with prolonged, unchanging sounds.

In the second type, a plurality of filters are arranged in parallel, and the output of each filter is indicated by the height of a corresponding line on the screen of a cathode-ray oscillograph. Connection in turn between each filter and the cathode-ray tube is accomplished up to about ten times a second by a mechanical switch.

The present invention is broadly of the second of the above types of instruments. No mechanical switch is used, but by means of a novel electronic switching circuit, the switching rate is increased from about ten to sixty cycles per second. It is to be understood, however, that the novelty of this invention is not limited to the electronic switch, nor to the substitution thereof for a mechanical switch. Neither is the speed of the electronic switch herein illustrated limited to a speed of sixty cycles per second.

This invention is adapted to receive an electric potential, corresponding to the sound under investigation, and apply it to a parallel arrangement of twenty-eight separate filter channels, comprising an all-pass, a low-pass, a high-pass and twenty-five band-pass filters. The band-pass filters are spaced at intervals of one-third octave throughout the audio range from twenty-five to ten thousand cycles per second. The output signals of the filter channels are "scanned" by the electronic switch sixty times per second, and the composite output of the electronic switch is observed as the vertical deflection on a cathode-ray oscillograph.

The analyzer also provides a horizontal deflection voltage for the cathode-ray oscillograph, so as to put on the screen a plot of the distribution of the sound intensity as a function of frequency.

One object of the invention is the provision of a wave analyzer which will substantially instantaneously resolve into pre-selected components a complex wave, and substantially simultaneously produce for visual or photographic inspection the values of all of the components.

Another object is to provide an electronic switching means which will apply to a single line successively and repeatedly and with great rapidity the outputs of a plurality of circuits.

A further object is to provide a stairwave or stepwave generator and means for counting the steps of the generator and resetting the circuit after a predetermined number of steps have been completed.

It is also an object of the invention to use a so-called ring circuit of gas-filled triodes, and to provide means for inhibiting the firing of more than one such tube at a time.

A still further object is the provision of means by which two associated ring circuits may be started and maintained in perfect predetermined time-phase with each other.

It is also an object of the invention to provide with a circuit the output of which is normally a wave form with undesirable voltage peaks means for eliminating the said voltage peaks.

Another object of the invention is the provision of a simple and effective electronic voltage regulator.

Additional objects of the invention will be apparent from a reading of the following specifications and claims.

GENERAL DESCRIPTION

Figure 1:
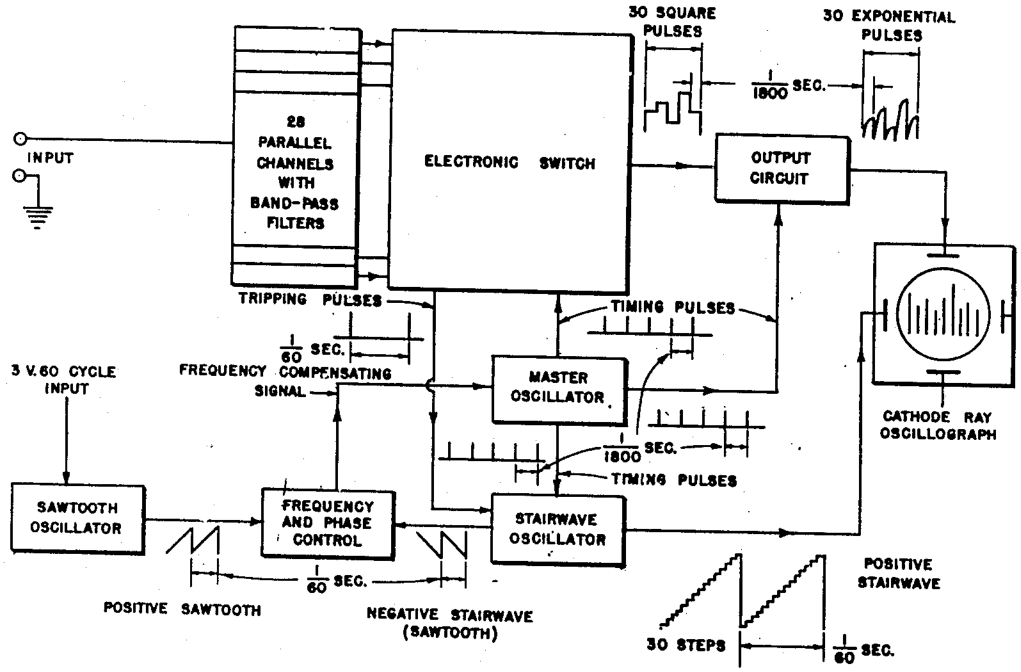
Figure 1 is a block diagram of the analyzer of my invention. The approximate wave forms are indicated beside the pertinent leads.

With reference to the block diagram of Figure 1, it is the function of the acoustic analyzer of this invention to receive a signal of complex wave form, to resolve this signal into components falling within definite frequency bands, and to indicate the relative values of these components. The quantity with which the instrument deals is voltage per unit frequency interval, integrated over the respective frequency bands and averaged in some fashion over time.

This is accomplished in the following manner:

A signal obtained from a microphone or other source is applied simultaneously to a parallel arrangement of twenty-eight filter channels. Of these channels, twenty-five contain band-pass filters corresponding to the desired components, one contains a low-pass filter, and one, a high-pass filter; the latter two cover components well below twenty-five and well above ten thousand cycles per second. The remaining channel has an essentially flat frequency characteristic for picking up and averaging sounds over the whole useful range of the analyzer.

Each channel contains an amplifier and a signal rectifier. These, as well as some other elements mentioned in the general description do not appear in the block diagram of Figure 1 as elements. They will be found in subsequent figures and will be described in connection therewith. The output of the rectifier is applied to a condenser and shunt resistance having a time constant of approximately 0.2 second. The voltage appearing across the condenser is proportional to the vector sum of the voltage amplitudes of the components of the input signal lying within the frequency limits of the associated channel, and this voltage determines the output signal of each filter channel.

By means of a novel switch the output of each of the twenty-eight channels is successively applied sixty times per second to a common line. There are thirty steps in the switch, so that each channel is connected for an interval of 1/1800 second. The two extra steps (there being but twenty-eight channels) are required for synchronization and are normally blank. The common output line leads through another network to the vertical deflecting plates of a cathode-ray tube. The switch is also used to count the steps of a stairwave (also known as "stepwave") generator and to reset this circuit after thirty steps have been completed. The timing of the switch is controlled by a master point pulse oscillator.

The $x$-axis deflection signal applied to the horizontal deflecting plates of the oscillograph consists of thirty successive increases of voltage, separated by intervals of constant voltage. This sweep signal is obtained from the stairwave generator, which is controlled by the master oscillator and by the electronic switch. Another signal from the stairwave generator is combined with a sawtooth signal synchronized to the power line frequency and this combination is used to control the frequency of the master oscillator so that it is exactly thirty times the line frequency. A signal from the master oscillator also controls the output circuit and synchronizes it with the switching circuits.

The composite output of the electronic switch is applied to an output circuit before passing to the vertical deflecting plates of the oscillograph. This output circuit modulates the output signal of the electronic switch and controls the final indication on the cathode-ray oscillograph. The timing signal applied to the horizontal deflecting plates of the oscillograph is reproduced on the screen as a series of thirty equally spaced spots, corresponding to the thirty steps of the stairwave. If the output of the switch were applied directly to the vertical deflecting plates of the oscillograph, the screen pattern would consist of thirty spots appearing at various heights above the spots on the axis. The height of the displaced spot in each case would be proportional to the output voltage of the corresponding channel. The output circuit transforms this thirty-step histogram output of the electronic switch into thirty exponential pulses as shown in Figure 1, extreme upper right hand corner. The height of each exponential pulse is proportional to the signal amplitude of the corresponding channel in the switch output. The pattern on the oscillograph screen then assumes the appearance of a set of thirty vertical lines or "thermometers" which rise and fall as the output voltages of the corresponding channels change.

Merely because of lack of space, the oscillograph pattern of Figure 1 does not include the full number of "thermometers." For the same reason the stairwave form shown does not include thirty steps.

A typical pattern appears in Figure 2, wherein will be seen two horizontal scales below the pattern proper. The upper scale 40 is graduated from 1 to 30, and each marker on the scale represents one of the filter channels, except for the markers at 1 and at 30, which latter are so-called "dummy" markers, the pattern spots above these indicating the base line above which the heights of the other lines are measured. From a comparison of upper scale 40 with the lower scale 41 (which is similar but is calibrated in cycles per second), it will be seen that marker 2 of scale 40 represents the low-pass filter values; markers 3 through 27, the band-pass channel responses; 28, the high-pass; and 29, the all-pass. The "thermometer" above marker 29, in other words, the all-pass indication, has a different vertical scale than the others of the pattern, since otherwise it commonly would be off the screen entirely. The arrangement that makes this possible will be described later in the specification.

Figure 2:
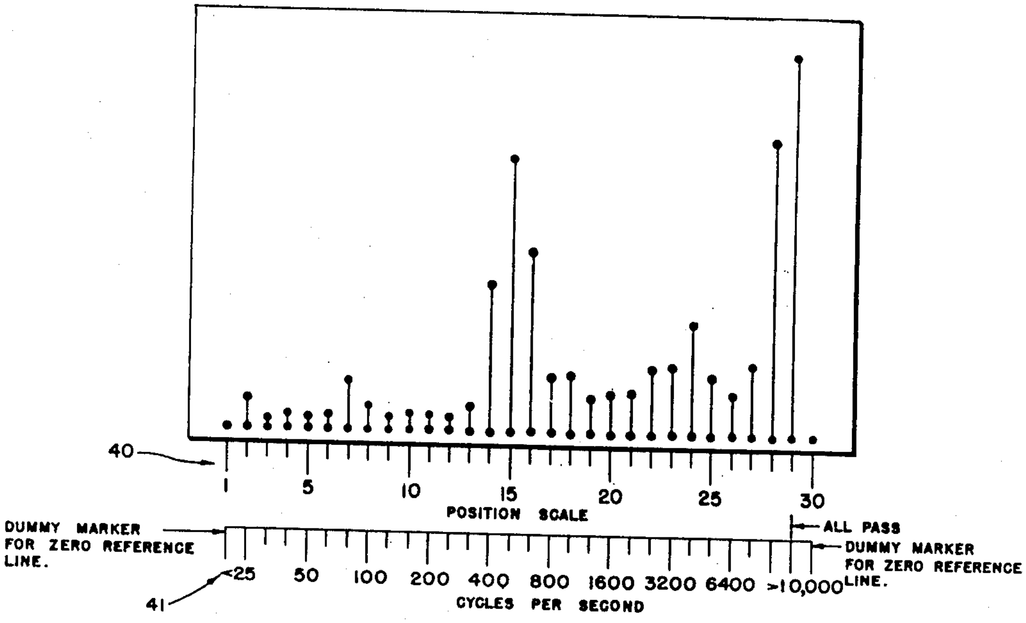
Figure 2 is a typical pattern such as appears on the screen of the cathode-ray tube.

It should be understood that Figure 2 is somewhat diagrammatic. In the oscillographic pattern itself, the background, of course, is dark and the "thermometers" appear as streaks of light. Further, the thermometers are not quite as regular in form as they appear in the drawing.

A standard commercial cathode-ray oscillograph is used to indicate the amplitudes of the output voltages of the various channels. Minor modifications of the commercial form of the oscillograph circuit are necessary to adapt it to the type of indication desired in this instrument, but these will be obvious to those skilled in the art.

The analyzer is designed to operate on 120-volt 60-cycle regulated power. A standard voltage-regulating transformer can be used to supply this power from a single phase 220-volt 60-cycle line. Two power supplies, each containing electronic voltage regulators, provide plate voltage to the filter channels and to the timing circuits, switching circuits, and output circuits respectively.

DETAILED DESCRIPTION

As is apparent from an inspection of the drawings and of the brief descriptions thereof, each figure represents a different circuit component of the invention. Due to the number and complexity of these circuits, it is not possible to show in detail in one figure the whole combination; instead, the description and the block diagram must be relied upon to explain the relationships between the parts.

Resistance values where given are in ohms (Ω), kilohms (K) or megohms (meg.). Capacitances are in microfarads, when the value is followed by the character "μ"; if the numerical value is followed by "μμ," the quantity is micro-microfarads. Values of inductances are in henries. These values, when important, are given, either in the specification or on the drawings. If the latter, the values appear, when space permits, immediately adjacent the elements in question or the reference characters pertinent thereto. Where this practice would congest a portion of a drawing unduly, the value may be spaced from the element to which it applies and connected therewith by a dotted line. If a component is repeated in a circuit, the value thereof is given only once.

FILTER CHANNEL CIRCUITS

As previously described, twenty-eight filter channels are arranged in parallel between the input receptacle and the input to the electronic switch. Twenty-five of these channels contain band-pass filters which have tuned frequencies differing successively by one-third of an octave. One channel contains a low-pass filter having a cut-off at about twenty-five cycles per second; one contains a high-pass filter having a cut-off at about ten thousand cycles per second; and one contains an amplifier having a response uniform within plus or minus five per cent from about two cycles to thirty thousand cycles per second.

Table A gives the filter components for the particular embodiment of the invention which is herein described. It will be ovbious that modifications of the system, as, for instance, the use of different frequency bands, will require changes in the characteristics of the filter elements.

*Table A*

| Frequencies, C. P. S. | Component Number in Figure 3 | | | | | | | | | | | |
|---|---|---|---|---|---|---|---|---|---|---|---|---|
| | 45 | 60 | 61 | 56 | 46 | 62, 63 | 64 | 65 | 66, 67 | 68 | 69, 70 | 71, 72 |
| | | | | | Unit Value | | | | | | | |
| | K | K | K | Ω | [1] μf. | μf. | μf. | μf. | μf. | μf. | μf. | h. |
| 0–25 | | | | | | See Figure 4 | | | | | | |
| 31.5 | 40 | 10 | 100 | 250 | 0.1000 | 1.200 | 0.1900 | 40 | 0.2 | 0.10 | 0.50 | 19 |
| 39.7 | 40 | 8 | 100 | 100 | 0.1000 | 1.200 | 0.1900 | 40 | 0.2 | 0.10 | 0.50 | 12 |
| 50 | 40 | 6.67 | 100 | 500 | 0.1000 | 0.600 | 0.0960 | 40 | 0.2 | 0.10 | 0.50 | 15.100 |
| 63 | 40 | 8.57 | 100 | 500 | 0.1000 | 0.600 | 0.0960 | 40 | 0.2 | 0.10 | 0.50 | 9.500 |
| 79.4 | 40 | 6.67 | 100 | 000 | 0.0500 | 0.600 | 0.0960 | 40 | 0.1 | 0.10 | 0.25 | 6 |
| 100 | 40 | 8 | ∞ | 100 | 0.0500 | 0.360 | 0.0690 | 40 | 0.1 | 0.10 | 0.25 | 6.300 |
| 126 | 40 | 8 | 100 | 000 | 0.0500 | 0.240 | 0.0380 | 40 | 0.1 | 0.10 | 0.25 | 5.940 |
| 159 | 40 | 4 | ∞ | 100 | 0.0500 | 0.240 | 0.0380 | 20 | 0.1 | 0.10 | 0.10 | 3.740 |
| 200 | 40 | 10 | 100 | 166 | 0.0100 | 0.180 | 0.0300 | 8 | 0.1 | 0.01 | 0.10 | 3.150 |
| 252 | 40 | 8 | 40 | 000 | 0.0100 | 0.180 | 0.0300 | 8 | 0.1 | 0.01 | 0.10 | 2 |
| 318 | 40 | 10 | 100 | 000 | 0.0100 | 0.120 | 0.0190 | 8 | 0.1 | 0.01 | 0.10 | 2.130 |
| 400 | 40 | 6.67 | ∞ | 30 | 0.0100 | 0.120 | 0.0190 | 8 | 0.1 | 0.01 | 0.10 | 1.344 |
| 504 | 250 | 5 | 23.1 | 250 | 0.0010 | 0.120 | 0.0196 | 8 | 0.1 | 0.01 | 0.01 | 0.846 |
| 635 | 250 | 8 | ∞ | 30 | 0.0010 | 0.060 | 0.0096 | 8 | 0.1 | 0.01 | 0.01 | 1.065 |
| 800 | 250 | 5 | 28.3 | 000 | 0.0010 | 0.060 | 0.0096 | 8 | 0.1 | 0.01 | 0.01 | 0.672 |
| 1008 | 250 | 2.50 | 40 | 7.5 | 0.0010 | 0.060 | 0.0096 | 8 | 0.1 | 0.01 | 0.01 | 0.423 |
| 1270 | 500 | 8 | 250 | 50 | 0.0002 | 0.036 | 0.0058 | 8 | 0.1 | 0.01 | 0.01 | 0.390 |
| 1600 | 500 | 8 | ∞ | 71.4 | 0.0002 | 0.024 | 0.0038 | 8 | 0.1 | 0.01 | 0.01 | 0.369 |
| 2016 | 500 | 4.75 | ∞ | 50 | 0.0002 | 0.024 | 0.0038 | 8 | 0.1 | 0.01 | 0.01 | 0.232 |
| 2540 | 500 | 2.50 | 200 | 32.5 | 0.0002 | 0.024 | 0.0038 | 8 | 0.1 | 0.01 | 0.01 | 0.146 |
| 3200 | 500 | 6.67 | 500 | 100 | 50μμ | 0.012 | 0.0019 | 8 | 0.1 | 0.01 | 0.01 | 0.184 |
| 4032 | 500 | 5 | ∞ | 50 | 50μμ | 0.012 | 0.0019 | 8 | 0.1 | 0.01 | 0.01 | 0.116 |
| 5080 | 500 | 4 | ∞ | 60 | 50μμ | 0.012 | 0.0019 | 8 | 0.1 | 0.01 | 0.01 | 0.0732 |
| 6400 | 500 | 4.44 | ∞ | 500 | 50μμ | 0.006 | 960 | 8 | 0.1 | 0.01 | 0.01 | 0.092 |
| 8064 | 500 | 3.33 | ∞ | 100 | 50μμ | 0.006 | 960 | 8 | 0.2 | 0.01 | 0.01 | 0.058 |
| 10⁴–∞ | | | | | | See Figure 5 | | | | | | |
| 0–∞ | | | | | | See Figure 6 | | | | | | |

Figure 3:
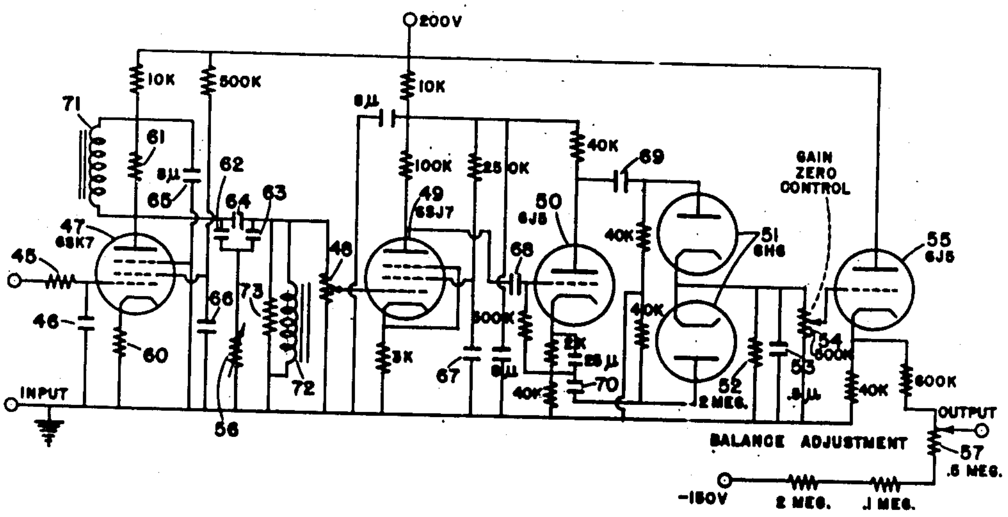
Figure 3 is a circuit diagram of a typical band-pass filter channel.

The values of resistors corresponding to resistor 73 of Figure 3 must be carefully selected to give the filter channels the desired characteristics. The values are not listed because the selection requires closer tolerances than those usually implied by the nominal value of a resistance.

[1] In this table, as in the drawings, a capacity value, when followed by the notation "μμ" is in terms of micro-microfarads.

Consider first the typical band-pass channel of Figure 3. The arrangement of resistance 45 and condenser 46 provides a preliminary filtering action. The signal is then amplified by pentode tube 47 and fed into the filter network, The output of the filter network is fed through a gain control 48 to the grid of a second amplifier tube 49 and thence to the grid of tube 50. The latter tube uses both plate and cathode coupling to apply a push-pull signal to the plates of a full-wave rectifier 51. The rectified output voltage appears across resistance 52, condenser 53 and resistance 54. This network has a time constant of 0.2 second (for discharge), and, accordingly, rapid variations of the signal are partially filtered out. A fraction of the voltage across resistance 54 is applied to the grid of the direct-coupled, cathode-follower tube 55. The output of the cathode network of this and every other channel is connected to the suppressor grid of a separate matrix tube of the electronic switch (Figure 9), to be later described.

In each filter channel there are four resistance controls. The first, 56, determines the selectivity of the filter and is permanently set in accordance with the values given in Table A. Potentiometer 48 also is not normally varied. It is adjusted so that a desired input level to the filters, between 0.1 and 1 volt root-mean-square, yields a voltage at the plates of 51 suitably within the linear range of this type of tube. Potentiometer 54 is the "Gain Zero" adjustment which will be further mentioned later. It controls the signal reaching the grid of tube 55 and ultimately the amplitude observed on the oscillograph screen. The usual adjustment is such that 1 volt R. M. S. (root-mean-square) into each channel produces a 2-inch deflection. Potentiometer 57, the "Balance" adjustment, determines the potential of the suppressor grid of the associated matrix tube in the electronic switch. It and the corresponding potentiometers of the other filter circuits are adjusted so that, with no signal, equal displacements, about 0.2 inch for all channels, are observed on the screen. The output signal of a channel is the variation above this initial voltage, and the matrix tube suppressor grid accordingly serves also as a signal grid.

Figure 4:
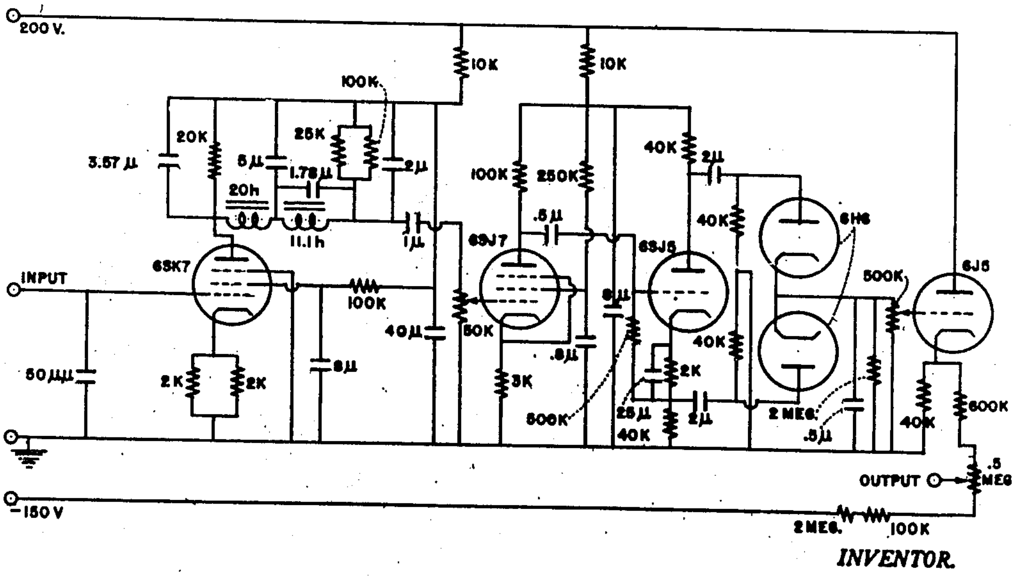
Figure 4 is a circuit diagram of the low-pass channel.
Figure 5:
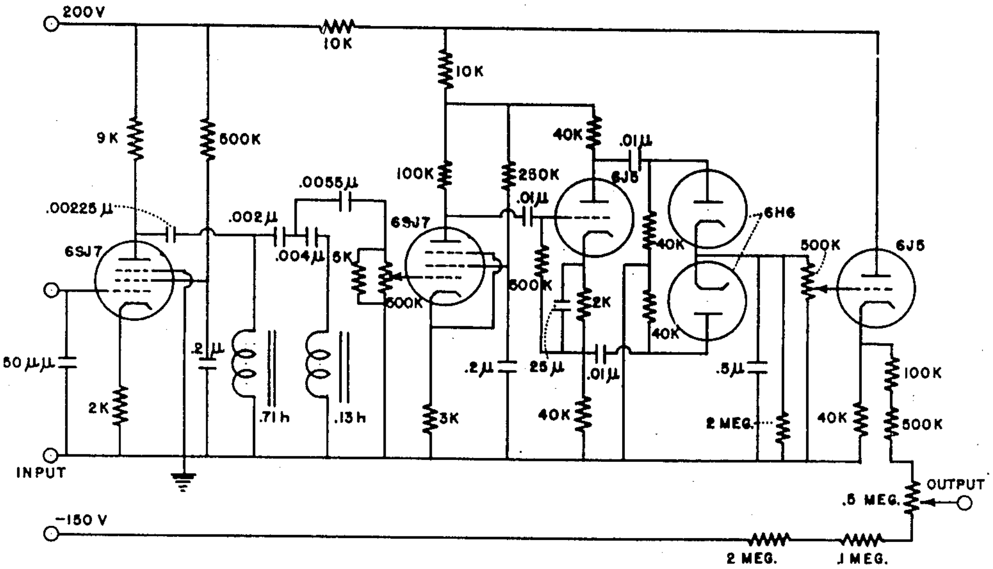
Figure 5 is a circuit diagram of the high-pass channel.
Figure 6:
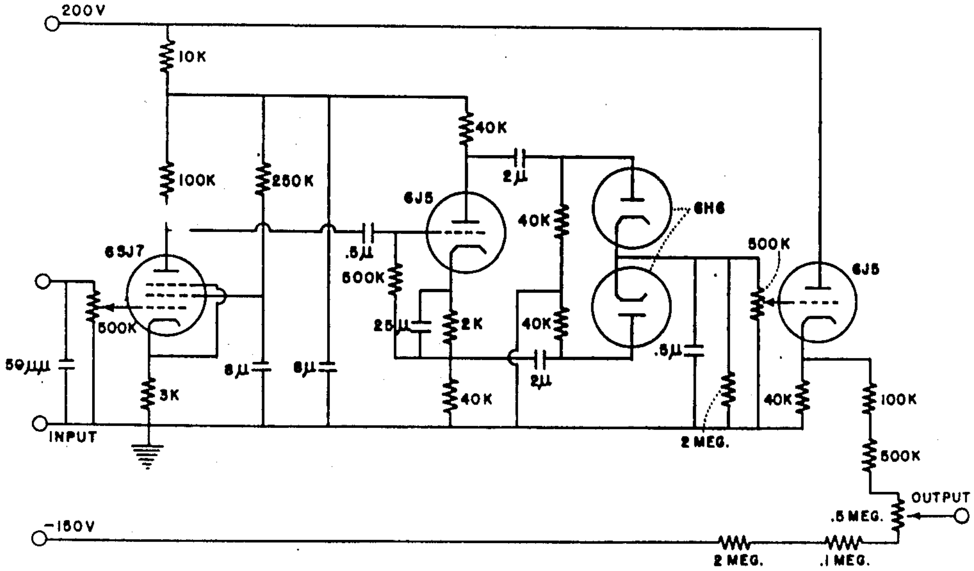
Figure 6 is a circuit diagram of the all-pass channel.

The low-pass, high-pass and all-pass filter channel circuits are shown in Figures 4, 5, and 6, respectively. The high-pass and low-pass channels differ from the band-pass channels only in the filter design. The all-pass channel contains only the last four tubes of a typical channel. These filter channels are fundamentally similar to that of Figure 3, and will not be described in detail. The values of the important components appear on the drawings.

Figure 7:
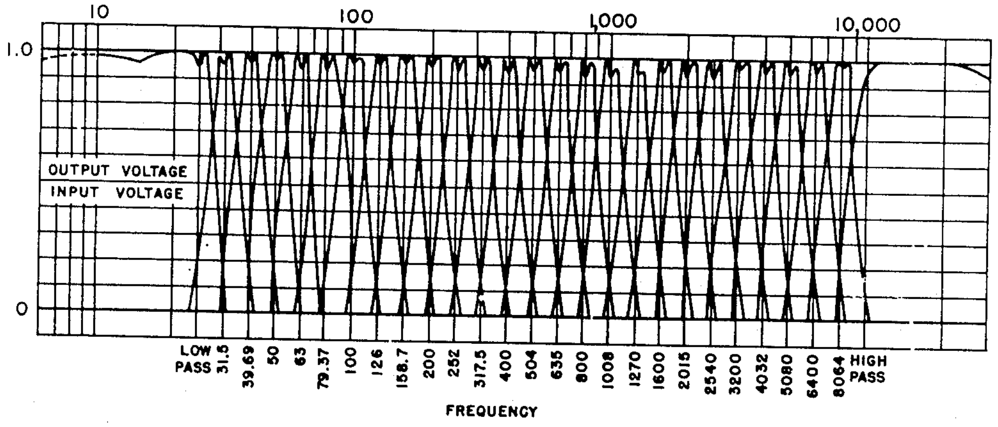
Figure 7 shows the response curves of the low-pass, the twenty-five band-pass, and the high-pass filter channels.
Figure 8:
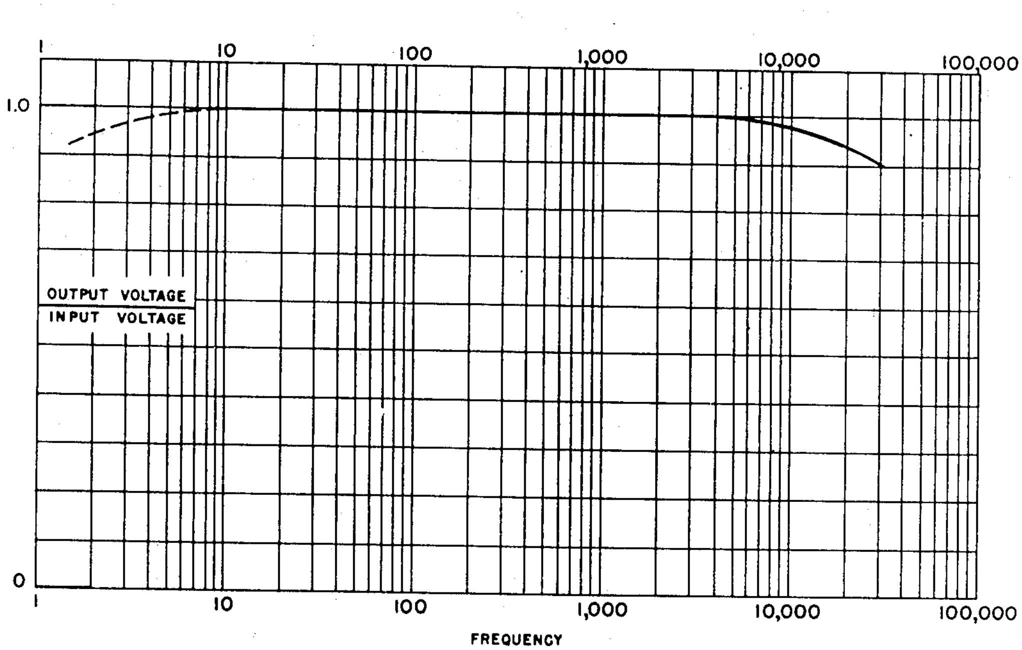
Figure 8 shows the response curve of the all-pass channel.

The frequency curves of the filter channels appear in Figure 7. Figure 8 is a separate curve of the all-pass channel response.

SWITCHING CIRCUITS

The purpose of the switching circuits is to apply voltage levels proportional to the output voltage levels of the twenty-eight channels to a single line successively and repeatedly. The switching circuits consist of the following fundamental circuits: The fast-switching ring, the inter-ring pulse-generator, the slow-switching ring, the "clipping" tubes, and the matrix tubes.

Figure 9:
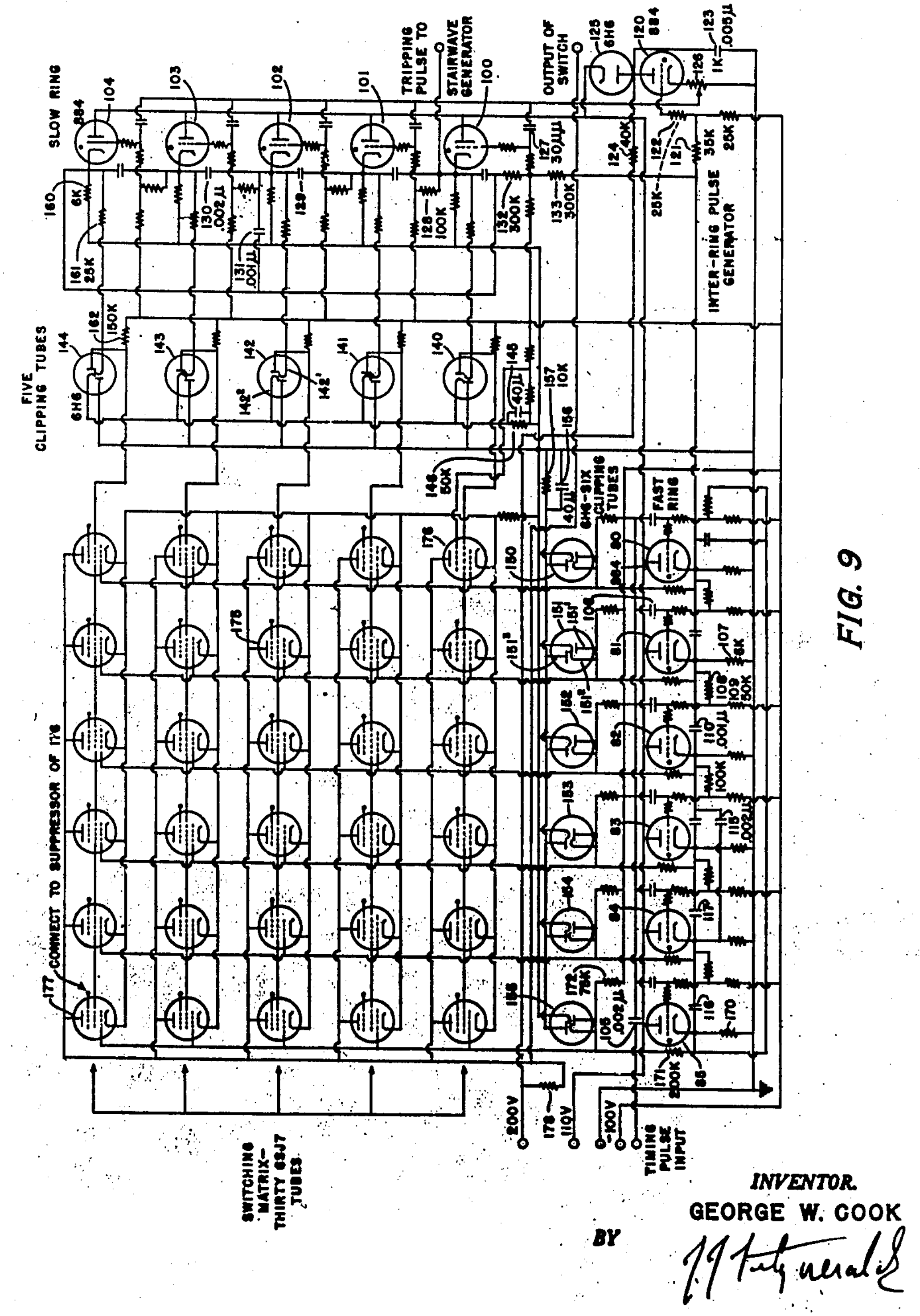
Figure 9 is a diagram of the switching circuits.

The following description refers chiefly to the circuit diagram of the switching circuits in Figure 9. Reference characters and electrical values therefor are given for only a portion of each circuit. Unless otherwise noted, the components and the values thereof are repeated throughout the respective circuits. Tubes in the fast ring are numbered from 80 to 85, inclusive. Tubes in the slow ring are numbered 100 to 104, inclusive.

*Fast switching ring*

Positively-polarized point-pulses, i. e., sharp pulses of voltage which last for only a small fraction of their period of repetition, are delivered from the master pulse oscillator through the condenser 105 at a repetition rate of 1800 per second. These pulses are applied to the grids of all six tubes of the ring through individual blocking condensers, as 106. The six tubes of the ring are thyratrons (gas-filled triodes) which have such a high negative grid bias that under normal conditions they are non-conducting. Under equilibrium conditions, the positive input pulses are not of sufficient magnitude to fire the tubes.

Consider the situation when one tube is already conducting, say 81. Current flowing through this tube raises the potential of the cathode because of the IR drop in resistor 107. By "IR drop" is meant the voltage drop in the resistance due to the passage of current therethrough. Current flows from the cathode of tube 81 through resistors 108 and 109. The IR drop in resistor 109 reduces the grid bias of tube 82, but not sufficiently, however, to fire 82. The decreased bias voltage is such that the next positive pulse from the master pulse oscillator, 1/1800 second later, will cause 82 to fire. Thus, current through tube 81 primes tube 82, so that the next pulse fires 82 in preference to all other tubes in the ring. While tube 81 is conducting, the condenser 110 is positively charged on the right hand side and at ground potential on the left hand side. When tube 82 becomes conducting, the left hand plate of this condenser is suddenly raised to a positive voltage well above ground. This drives the cathode of tube 81 momentarily positive with respect to its plate until the induced charge on 110 leaks off through resistor 107. Conduction in thyratron 81 ceases since its plate is negative with respect to its cathode. On the next pulse, the cycle is repeated with tubes 83 and 82.

Each tube as it becomes conducting extinguishes the preceding tube and primes the next tube. The tube 85 acts on tube 80 in the same manner as any other tube acts on its succeeding tube.

On the basis of the description to this point there could conceivably be established a condition with alternate tubes in the ring conducting simultaneously. That is, 80, 82, and 84 might fire together and prime 81, 83, and 85 for firing on the next pulse from the master oscillator. When the latter fired, they would first extinguish, then prime, 80, 82, and 84. The cycle would be repeated indefinitely at a rate of 900 per second. Such behavior is inherent in thyratron counting rings with more than four elements. In this switch such a tendency is inhibited in a novel manner by the capacitative coupling 115 between the cathodes of tubes 82 and 84. When 82 ignites, an extinguishing pulse is delivered to 81 and 83. In addition, the cathode of 84 is made positive momentarily and this pulse is delivered to the cathodes of 85 and 83 through condensers 116 and 117, respectively. Thus, if the ring starts out with more than one tube conducting, all tubes except 82 will be extinguished after one cycle of operation of the ring.

The method of self-quenching exhibited by this ring circuit prevents the accidental condition in which two tubes are fired simultaneously from continuing for more than one cycle of operation of the ring, which in this case, is 1/300 second. In actual practice, the operation is so fast that the ring assumes stable operation after the first two or three seconds of starting time, and the quenching of multiple firing is so fast that it is never observed.

The ring is started by unusually large pulses delivered from the master oscillator just after the power is turned on. The first pulse has sufficient magnitude to fire one or more of the six tubes. If more than one tube fires as a result of these enhanced pulses, the extra tubes will be extinguished after one cycle of operation of the ring, as previously described.

*Inter-ring pulse generator*

The input for the inter-ring pulse generator is obtained from the cathode of tube 80. When 80 is ignited, 85 is extinguished. The cathode of tube 80 goes highly positive momentarily, then remains at a lower but fixed positive value during the time the tube conducts. The resulting peaked square-wave signal is applied to the grid of thyratron 120 through resistors 121 and 122. 120 is normally non-conducting, but ignites on the peak of the positive signal from the cathode of tube 80. 120, therefore, fires with the same frequency as 80; namely, 300 times per second. A condenser, 123, is in parallel with the tube 120. This condenser charges through the resistance 124. The voltage to which it charges is limited by a diode, 125, which in turn determines the amplitude of the pulse developed across resistor 126. Extinction of tube 120 occurs while tube 80 is still conducting.

Positive point-pulses are thus obtained from the tap on 126. They have a duration of a few microseconds and a frequency of 300 per second.

*Slow switching ring*

The input to the second or slow switching ring consists of the positively-polarized pulses, having a frequency of 300 per second, which are generated by tube 120. These are applied to the grids of all five thyratrons (100 to 104, inclusive) in the slow ring through individual condensers, as 127. The tubes are normally non-conducting, and the positive pulses applied to the grids are just great enough to cause any of the tubes to fire. When a given tube is conducting it raises the grid voltage of the succeeding tube by means of the connection between the cathode of one tube and the grid of the following tube, i. e., resistor 128. Thus, if tube 101 is conducting, the grid bias of 102 is reduced to such a point that the next pulse applied to the common input will ignite tube 102 a few microseconds before it has increased sufficiently to reach the ionization potential of the other tubes. When 102 is fired, a pulse appears on the cathodes of 101 and 103, through the intercathode condensers 129 and 130, respectively. Tube 101 is consequently extinguished, and tube 103 is prevented from firing. In addition, a positive pulse is delivered to the cathode of 104 through condenser 131. This prevents tube 104 from firing and makes the cathodes of 103 and 100 more positive than they would otherwise be. Thus, although the pulse delivered to the common grid input has sufficient magnitude to fire any of the five tubes, the tube which is primed actually fires before the other tubes, and conduction of this tube prevents the other tubes of the ring from firing.

The priming on tube 100 is obtained partly from tube 104 and partly from tube 80. Resistor 132, between the cathode of tube 104 and the grid of 100 is larger than the analogous resistors, for example, 128. It is shown as 300K instead of 100K. There is also a lead from the cathode of tube 80 of the fast ring to the grid of thyratron 100 through resistor 133. The firing of tube 104 alone does not fully prime tube 100; the latter will be fully primed when tubes 104 and 80 fire together.

This novel double priming of tube 100 contributes what may be called a "selective starting" feature to the slow ring for, by this means, the first tube of the slow ring is forced to fire when the first tube of the fast ring fires; this insures perfect time-phasing of the two rings. If, by chance, the firing sequence of the slow ring becomes disorganized, the tube 104 will remain fired and will provide half-priming on tube 100 until the time when tube 80 is fired. Ignition of this tube produces full priming of tube 100 and starts the ring operating again in proper sequence and time-phase with respect to the fast ring. It is because of this positive "lock-in" between the two rings that a synchronizing signal can be taken from the slow ring to the stairwave generator, and ultimately, to the master oscillator, to keep the entire system in proper sequence and time-phase and in synchronism with the 60-cycle power line.

The selective starting and the "waiting until synchronism" features of the slow ring, which are provided by the two sources of priming for tube 100 and which permit the perfect synchronism of the two rings, are not essential, because of the positive extinction of other tubes by condensers 131, 129, etc. They are important, however, adding to the stability of operation of the slow ring and the combined rings.

Figure 11:
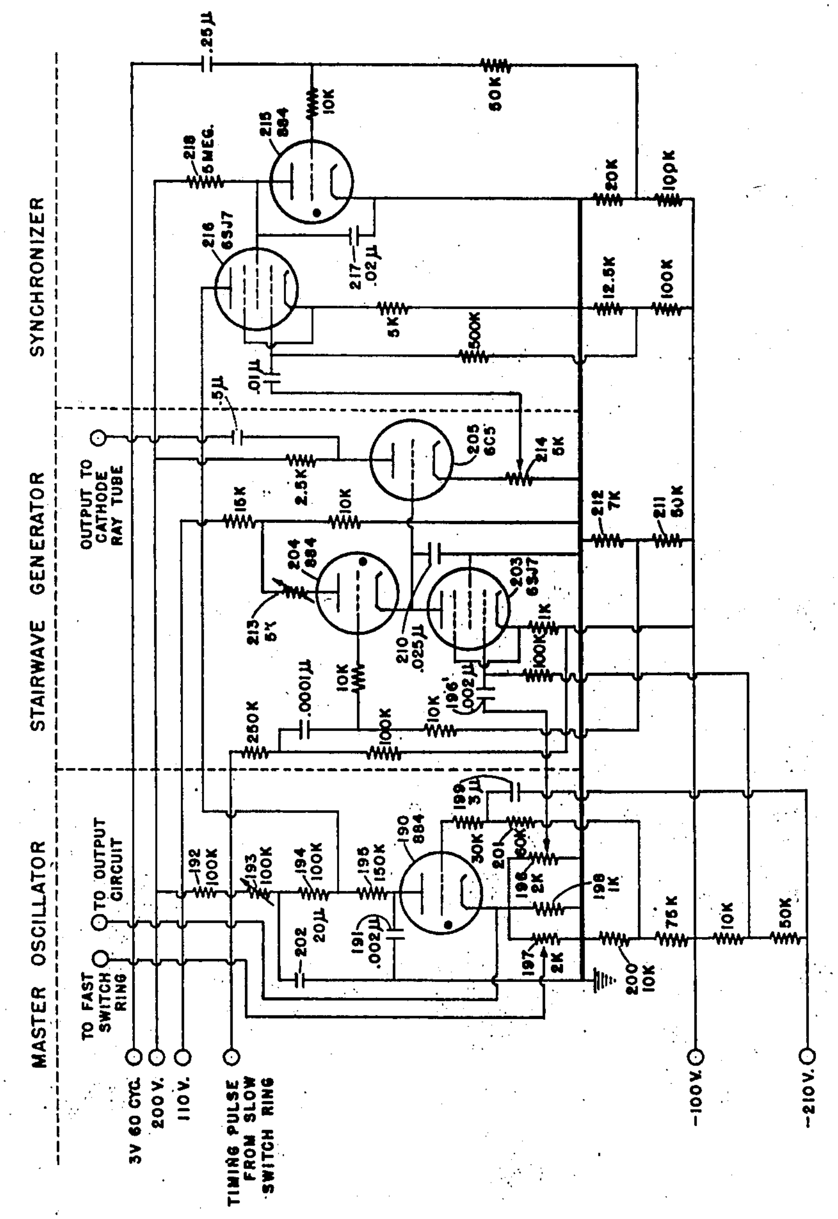
Figure 11 illustrates the timing circuits.

When tube 100 ignites, the voltage of the cathode becomes positive. A lead is taken from this cathode to the stairwave generator. The signal on this lead consists of a positive voltage during the time 100 is conducting. 100 conducts for an interval of 1/300 second with a frequency of 60 per second. This signal is carried to the stairwave generator of the timing circuits (Figure 11). The action of this pulse will be described later in the section on the Timing Circuits. Thus the switching rings act not only as control tubes for the matrix tubes of the switch, but also as a counting circuit. This has the effect of stabilizing and synchronizing the stairwave form to a pattern of exactly thirty steps.

*Clipping tubes*

The term "clipping tube" is used herein to denote a tube the function of which is to "clip" off undesired peaks of a given voltage wave, i. e., the clipping tube operates as a voltage limiter. In its application here, the clipper is used to cut off the sharp peaks caused by the extinguishing action of the cathode coupling condensers; these peaks, in both a positive and a negative direction, are of about twice the magnitude of the switching potential developed at the cathode of the gas triode. Failure to eliminate them causes spurious and undesirable voltage pulses in the output of the electronic switch which tend to confuse its already-complicated composite output signal. The application of this "clipping" principle to the elimination of the undesirable switching pulses obtained from the ring-counter types of electronic switch is believed to be novel.

One tube, a duplex diode, is used to limit the output signal from each thyratron in the two ring circuits. These clipping tubes by-pass the sharp, high-frequency pulses in the output of the ring tubes and provide a regular square wave. All clipping tubes for the fast ring are connected in the same way; likewise, all clipping tubes for the slow ring are connected in the same way. However, because the maximum output signal voltage of a tube in the fast ring must be negative or zero, while the output voltage of a tube in the slow ring must be positive, the groups of clipping tubes for the two rings are connected differently.

The clipping tubes for the slow-ring thyratrons 100 to 104, inclusive, are numbered 140 to 144, respectively. Consider as an example the duodiode 142. The output of thyratron 102 consists of a positive square wave with a sharp positive peak on the leading edge of the square wave and a sharp negative peak on the trailing edge. When a negative voltage is applied to the ring side of tube 142, the cathode $142^1$ is negative with respect to its plate. The lower diode conducts and the negative signal is effectively short-circuited to ground. This limits the output of thyratron 102 to positive voltages.

The operation of the other part of tube 142 is as follows: When the ring side plate is more positive than its cathode $142^2$, the other diode of 142 (i. e., cathode $142^2$ and its associated plate) conducts. The signal voltage is thus limited by the voltage of the cathode $142^2$ of the tube. This cathode voltage is determined by the equilibrium voltage of condenser 145 shunted by resistance 146. This voltage is developed by the continuous flow of current from each clipper tube in succession. Condenser 145 is constantly being charged since one of the five slow-ring clipping tubes is always conducting. It discharges at a constant rate through resistance 146. Consequently the maximum value of the output signal of the ring tube is determined by the value of resistance 146.

The clipping tubes for the fast ring tubes 80 to 85, inclusive, are numbered 150 to 155, respectively. Now consider tube 151. The output of thyratron 81 consists of a positive square wave with positive and negative peaks as before. However, the reference voltage of the positive pulse is to be below cathode potential since the entire signal is to be applied to a control grid. Consequently the upper limit of this signal must be little greater than zero voltage. This is accomplished as follows: When plate $151^1$ of duplex diode 151 is positive, the right hand diode of this tube conducts: this effectively shorts the signal to ground. When cathode $151^2$ of tube 151 is negative with respect to its plate $151^3$, the left hand diode of the tube conducts. Therefore, the output of tube 81 cannot be more positive than the voltage drop in the diode (referred to ground) and cannot be more negative than the plate $151^3$ of tube 151. The voltage of this plate is fixed by the voltage across condenser 156. This condenser is constantly being charged because one of the clipping tubes for the fast ring is always conducting. It is constantly being discharged through the shunt 157. Consequently, the reference voltage for the pulses delivered by thyratron 81 is negative and is determined by the resistance 157.

The networks comprising (for example) resistors 160, 161, and 162, in the one case, and 170, 171, and 172, in the other, determine the grid bias voltages of the matrix tubes for the slow ring and the fast ring.

*Matrix tubes*

The switch proper consists of thirty pentodes arranged in rows of six tubes each and columns of five. The clipped output of each thyratron in the fast ring is applied to the control grids of all of the five tubes of the corresponding column. The clipped output of each thyratron in the slow ring is applied to the screen-grids of all of the six tubes of the corresponding row. The matrix tubes are normally non-conducting, since both control and screen grids are biased beyond cut-off.

If tube 81 is conducting, however, the control grids of all of the five tubes in the column associated with it are brought above cut-off potential. If thyratron 102 is conducting, the screen grids of all the six tubes in its row are brought above cut-off potential. For a matrix tube to be conducting, both the screen grid and the control grid must be at elevated voltages. Consequently, only pentode 175 is conducting.

The cycle of operations is as follows: Assume that thyratron 100 of the slow ring is conducting. The fast ring goes through its cycle with each of the six tubes conducting in the order 80 to 85. When the fast ring completes its cycle, 100 is extinguished, and 101 becomes conducting. The cycle of the fast ring is repeated, and the conducting tube in the slow ring changes again. This continues until all combinations of pairs between the fast and slow rings have been conducting simultaneously. One complete cycle of the switch occurs every $\frac{1}{60}$ of a second in the apparatus herein shown and described.

The output lead of each of the twenty-eight filter channels is connected to the suppressor grid of one of twenty-eight of the thirty matrix tubes. The two remaining tubes, as 176 and 177, have fixed voltages applied to their grids to provide a reference level for the output signal voltages of the other tubes. These two tubes supply the dummy markers on the oscillograph screen. All of the tubes in the switching matrix have a common plate resistor, 178. The output signal of the switch is taken from this common plate lead to the output circuit, and it is fed to the composite output circuit of the analyzer.

OUTPUT CIRCUIT

Figure 10:
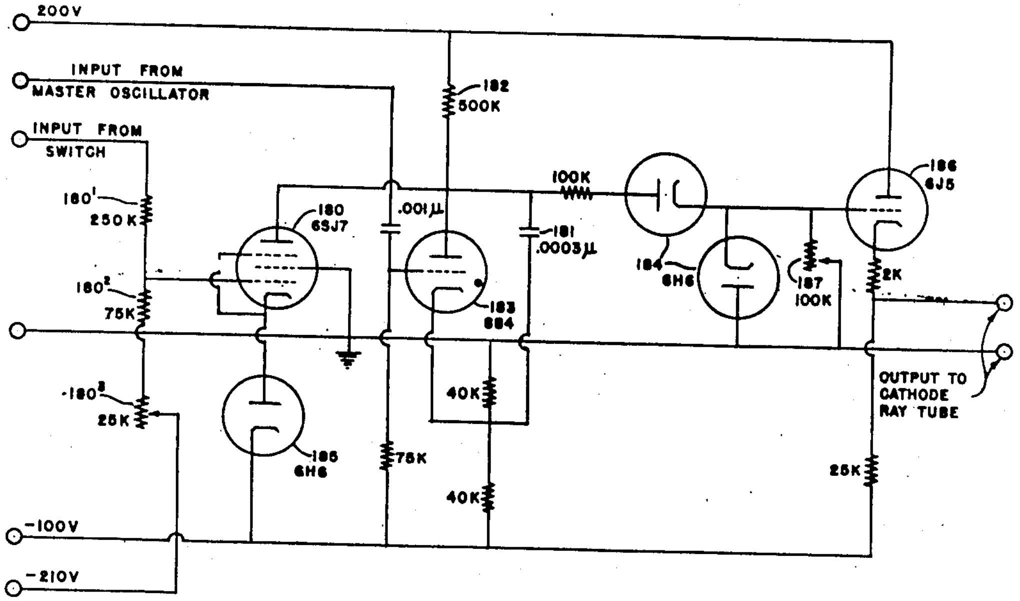
Figure 10 is a diagram of the output circuit.

The output circuit, Figure 10, receives a complex signal from the electronic switch and modifies this signal so that a convenient pattern will be obtained on the cathode-ray tube screen. The input to this circuit consists of a histogram in which the voltage at a given time is proportional to the output voltage of the corresponding filter channel. Each of the thirty matrix tubes of the switch circuit is connected to the input line for an interval of $^1/_{1800}$ second at a rate of sixty times per second.

The input signal is applied directly to the grid network, $180^1$, $180^2$, $180^3$, of pentode tube 180. During each of the periods of $^1/_{1800}$ second the grid voltage is constant and the plate current is constant. Consequently, during each period, condenser 181 is charged. The time constant of this condenser is short compared with $^1/_{1800}$ second, so that 181 is practically fully charged after about $\frac{1}{3}$ of this period. The voltage across 181 is essentially equal to the plate voltage of tube 180, which is determined by the current flowing through this tube and resistor 182 and is proportional to the signal grid voltage.

Normally thyratron 183 is not conducting. At the end of each 1/1800 second interval, a positive pulse (obtained from the timing circuit) is delivered to the grid of 183. This pulse ignites 183 and condenser 181 discharges.

The voltage across tube 183 drops almost instantaneously to a value which will not support the discharge, and the tube is extinguished. The charging cycle is then repeated. Again the final voltage across condenser 181 is determined by the plate current in tube 180.

The voltage across condenser 181 increases exponentially with time to about 97 per cent of the charging voltage, then decreases abruptly to zero, then increases exponentially again to about 97 per cent of a different charging voltage, which is determined by the output amplitude of the particular filter channel which is connected to it through the electronic switch. This cycle is repeated indefinitely. This signal is applied to a duplex diode 184. When arranged as shown this tube removes negative peaks introduced into the signal by the action of thyratron 183. The series rectifier will not pass the negative part of the signal. However, due to the inter-electrode capacity of the tube, sharp negative peaks are passed through the rectifier. These are short-circuited to ground by the parallel rectifier.

The diode 185 in the cathode lead of pentode 180 serves two purposes. One is to provide a cathode load and introduce degeneration into the operation of tube 180; this could equally well be done by a resistor. Further, small slow changes in the heater voltage of the matrix tubes of the switch, due to supply-line voltage changes, produce corresponding level changes in the voltage of the output signal. Diode 185 has the same heater characteristics as the tubes of the switching matrix. When current through the switch is increased by increased heater voltage, the grid of tube 180 becomes more negative and this tube becomes less conducting. However, there is an increase in conductivity in tube 185 due to the same change in heater voltage which decreases the bias on both control and screen grids of 180, thus compensating for the change as it occurs.

The purpose of triode 186 is to operate as an impedance transformer by means of cathode loading and thus to provide a lower impedance output line to the vertical deflecting plates of the oscillograph. This output tube also isolates the sensitivity control 187 from the effects of varying external loading conditions.

The adjustable resistor 180³ has an important function not yet described. It provides what may be termed a "movable threshold" for the indication on the cathode ray tube screen. Adjustment of this resistor determines the grid value at which tube 180 will conduct, and thus the lower limit of the indicating thermometers. It is therefore possible, without disturbing the relative heights of the thermometers, to increase or diminish their overall average height.

TIMING CIRCUITS

The master pulse oscillator, the stairwave generator, and the synchronizer comprise the timing circuits. A schematic diagram of the timing circuits is shown in Figure 11.

*Master pulse oscillator*

The master pulse oscillator consists of a gas-filled triode 190 arranged as a relaxation oscillator having a frequency of 1800 per second. The tube is normally non-conducting. The condenser 191 in parallel with tube 190 charges in accordance with the time constant which is the product of the capacity of the condenser and the sum of the series plate resistors 192, 193, 194 and 195 as modified by the plate current of the tube 216.

When the voltage across 191 reaches a critical value, determined by the grid bias of tube 190, this tube conducts and discharges the condenser in a few microseconds. During the time that tube 190 is conducting, current flows through its cathode resistance network. When condenser 191 is discharged, tube 190 is extinguished. The instantaneous high current causes a positive pulse to appear on the tap of resistor 196; this is delivered through the blocking condenser 196¹ to the grid of pentode 203 in the stairwave generator. A positive pulse also appears on the tap of resistor 197 and across resistor 198. These pulses are delivered to the switching and the output circuits respectively.

The frequency of the master oscillator can be adjusted by varying resistance 193 in its plate circuit. Condenser 199, between the grid network of thyratron 190 and the negative 210-volt source, serves the following purpose: When voltage is first applied to the master oscillator circuit, both plates of 199 are carried to a potential of −210 volts with respect to ground. As 199 charges, current flows from ground through resistors 200 and 201. Until the condenser is fully charged, the grid of tube 190 is thus more than usually negative. This large negative bias has the effect of increasing the breakdown voltage of the tube, and the amplitude of the first few oscillations thereof is increased. These large initial pulses provide an automatic starting of the switching ring in the absence of properly primed gas triodes. As long as any gas triode is ionized by this starting procedure, the self-synchronizing action of the ring circuits previously described will, after one or two cycles of operation, cause the rings to adjust themselves to the proper operating sequence and time phase. The starting action of the first switching ring has been explained in the section describing the switch circuits.

202 is a decoupling condenser which prevents the 1800-cycle pulses from passing onto the positive 200-volt line and to other circuits which draw their power from this common source.

*Stairwave generator*

The stairwave generator consists of a pentode 203, a thyratron 204, and a vacuum triode 205 and their associated networks. The stairwave generator serves the following two purposes:

(*a*) It provides a timing signal which is applied to the horizontal deflecting plates of the cathode-ray oscillograph.

(*b*) It supplies a signal to the synchronizer.

The timing signal consists of thirty equal-voltage increments separated by equal intervals of constant voltage. When applied to the horizontal deflecting plates of the cathode-ray oscillograph this signal produces a horizontal row of thirty equally spaced spots. The motion of the electron beam from one position to another occurs in a few microseconds. The beam is stationary in each position for about 1/1800 second. After the completion of thirty steps, the cycle is repeated.

The signal supplied to the synchronizer has the same form but is opposite in polarity.

The stairwave is produced by charging condenser 210 with thirty equal pulses. At the beginning of the cycle, this condenser is uncharged. Pentode 203 is normally biased beyond cut-off. The master pulse oscillator supplies positive point pulses which have constant amplitude and recur at the rate of 1800 per second. These pulses are taken from the tap on resistor 196 and are applied to the grid of tube 203 through the blocking condenser 196'. Each pulse causes the same plate current to flow since the trans-conductance of 203 is independent of plate voltage. This, together with the uniformity of the pulses, insures that equal charges pass through the pentode during each conduction period.

Tube 203 is operated between ground and —100 volts. During each conduction period a measured negative charge is deposited on condenser 210. The magnitude of the current surges in tube 203 and hence the negative voltage increments across condenser 210 are controlled by the resistor 196.

As condenser 210 becomes negatively charged the voltage between the plate and cathode of thyratron 204 increases. This tube is normally prevented from firing by the bias voltage supplied by the resistance network 211, 212. After thirty voltage increments have been impressed on the condenser, a positive pulse is delivered to the grid of tube 204 from the slow switching rings, which also act as a counting circuit, as explained in the section describing the switching circuits. This pulse causes 204 to conduct and the charge on condenser 210 passes off therethrough. When the thyratron is extinguished, condenser 210 begins to charge again because of the current pulses through pentode 203. This cycle is repeated indefinitely.

If the potentiometer 196 is set too high, condenser 210 will become highly charged before thirty steps have been completed. In this case the cathode of thyratron 204 becomes so negative with respect to the plate and grid that the grid loses control, and the tube conducts before the arrival of the timing pulse from the switch ring. This produces an unstable pattern on the cathode-ray screen. If the value of 196 is set too low, the cathode of the thyratron is not sufficiently negative after thirty steps to allow conduction in this tube, in spite of the positive pulse delivered to the grid. In this case, condenser 210 continues to charge until thirty more steps have been completed or until the cathode of the thyratron is sufficiently negative to produce uncontrolled conduction. Various types of multiple and unsatble patterns can be caused in this way. A wide range of adjustment is necessary to allow for differences in the characteristics of different master pulse oscillator thyratrons.

While thyratron 204 is conducting, the cathode potential is determined by the IR drop in the plate lead. Consequently the cathode voltage of this tube at the moment of extinction can be adjusted by varying the resistance 213.

The voltage appearing across condenser 210 is applied directly to the grid of the vacuum triode 205. A positive stairwave consisting of small voltage increments and a large abrupt decrement is obtained from the plate of this tube and is applied to the horizontal deflecting plate of the cathode-ray oscillograph. A negative stairwave consisting of small voltage decrements and a large increment is obtained from the tap on potentiometer 214. This signal is applied to the synchronizer.

*Synchronizer*

The synchronizer consists of a thyratron 215, arranged as a controlled relaxation oscillator, and a pentode 216 which acts as a mixer. The purpose of this circuit is to control the frequency of the master pulse oscillator. It provides a fixed phase relation between the horizontal axis sweep signal on the oscillograph and the power line voltage. To accomplish these ends, the frequency of the master pulse oscillator is adjusted to equal thirty times the instantaneous frequency of the power line.

The relaxation oscillator 215 has a free-running-frequency of about fifty-five cycles per second. A 3-volt 60-cycle sine wave is superimposed on the fixed bias of this tube. Although the average frequency of this signal is usually accurately 60 cycles, the instantaneous frequency may differ from this value. The 3-volt signal on the grid of the thyratron increases the frequency of oscillation of this tube from its free-running value of fifty-five cycles per second to the line frequency. A saw-tooth wave form, caused by the slow charging and rapid discharging of condenser 217, is applied to the screen grid of pentode 216. The time constant of this condenser charging through resistor 218 is of the same order of magnitude as the period of the line voltage. Consequently the voltage across condenser 217 increases at a nearly constant rate until thyratron 215 breaks down. The voltage to which the condenser charges is determined by the time at which the thyratron begins to conduct.

The negative stairwave signal obtained from the stairwave generator is applied to the control grid of the pentode 216. The step structure in the wave form of this signal may in this case be neglected. Essentially this voltage increases in a negative sense linearly with time to a fixed value, falls abruptly to zero, then increases again. For a given setting of resistances 196 and 213, the peak negative voltage of this signal is fixed. The rate at which this peak voltage is attained is determined by the frequency of the master pulse oscillator. Adjustment of potentiometer 214 controls the amplitude of this signal.

The negative stairwave voltage from potentiometer 214 returns to zero about three step units ($^3/_{1800}$ second) before the positive voltage from thyratron 215 does. Consequently the two grid voltages effectively combine to produce a current surge in pentode 216 near the end of the cycle. This increases the IR drop in the resistance network 192, 193, 194, decreases the plate voltage of tube 190 and consequently decreases the frequency of the pulses from the master pulse oscillator until the positive voltage on the screen grid of pentode 216 falls to zero. This pentode does not conduct except for this short interval at the end of each cycle; the length of time during which it conducts is determined by the relative phase of the positive saw-tooth signal on the screen grid and the negative stairwave signal on the control grid. If the peak of the negative signal and the drop to zero occur too soon, the pentode conducts for a longer period than the normal time of $^3/_{1800}$ second. This reduces the frequency of thyratron 190 and consequently brings the peak of the negative signal into the proper phase with the positive signal. If the peak of the negative signal occurs too late, the length of the pulse delivered by pentode 216 through resistors 192, 193, and 194 is decreased and compensation and synchronization are obtained.

POWER SUPPLY

Figure 13:
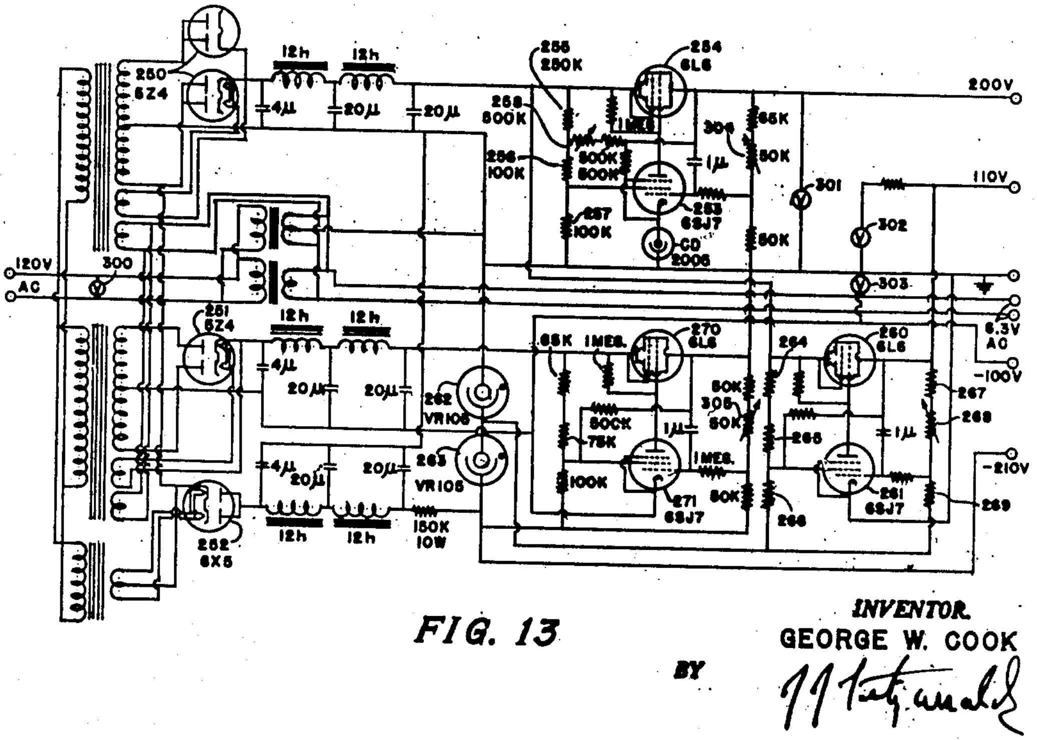
Figure 13 is a diagram of the main power supply.
Figure 12:
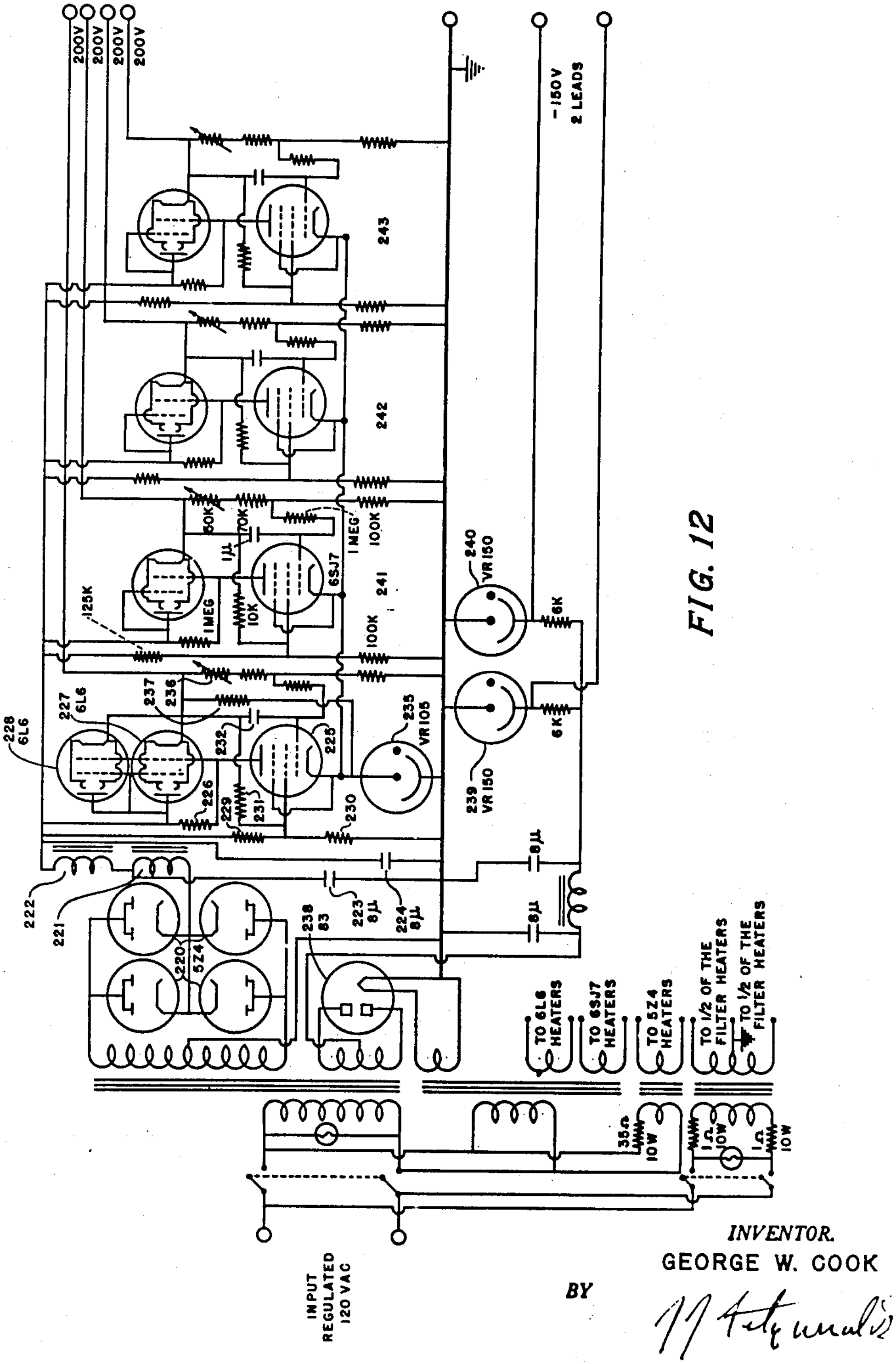
Figure 12 is a diagram of the filter power supply circuit.

Two independent electronically regulated power supplies are provided. One circuit supplies voltage for the twenty-eight channels. This is illustrated in Figure 12. The other circuit (Figure 13) supplies voltage for the timing circuits, the switch, and the output circuit.

*Filter channel power supply*

The input voltage to the power pack consists of 120-volt 60-cycle alternating current regulated by a constant voltage transformer. The transformer is preferably of large capacity, as 2-kilovolt-amperes. While such capacity is not necessary for the operation of the analyzer alone, it is a convenience in view of the fact that auxiliary equipment will commonly be employed. A full-wave rectifier 220 supplies positive voltage for the system. The rectified voltage is passed through a smoothing filter, comprising inductances 221 and 222, and condensers 223 and 224.

The operation of this circuit is as follows: A decrease in the value of the positive input voltage causes the screen grid of pentode 225 to become less positive. This decreases the plate current through the tube and decreases the IR drop through the resistance 226.

Two beam-pentode tubes, 227 and 228, are arranged in parallel and the grids of these tubes are tied to the plate of tube 225. Hence, when the plate current of 225 drops, the plate resistance of tubes 227 and 228 decreases, thus compensating for the original decrease in input voltage.

If the voltage on the screen grid of amplifier 225 were controlled by the resistances 229 and 230 alone, the variations of plate resistance of tubes 227 and 228 would overcompensate the input voltage variations. To eliminate this effect, the screen grid of the amplifier is connected to the cathodes of 227 and 228, through resistance 231. 231 is tied to the resistance network 229, 230 at a point having the same voltage as these cathodes. Thus, there is no D. C. voltage drop across resistance 231.

The excess signal voltage on the cathodes of 227, 228, caused by overcompensation tends to increase the voltage of the screen grid of the pentode 225 because of signal current through resistances 230 and 231. This adjusts for the overcompensation. The value of 231 is chosen to obtain exact compensation.

Sudden variations in the output load operate in a similar manner on the control grid of 225 through condenser 232. If the load is momentarily increased, a negative pulse is delivered to the control grid. This decreases the plate current of the pentode and decreases the grid bias voltage of the regulator tubes 227, 228, thus decreasing the plate resistance of the latter. Condenser 232 also prevents high frequency tube noise from the amplifier tube 225 or the voltage regulating tube 235 from appearing in the output. The nominal output potential of the regulator depends upon the grid bias of the pentode 225, and this is controlled by resistor 236.

Tube 235 has a characteristic such that the voltage drop across it is nearly independent of the current through it. This fixes the voltage of the cathode of pentode 225. In the circuit described and shown it is fixed at 105 volts above ground. Resistance 237 insures sufficient current through regulator 235 to maintain that tube on the stable portion of its operating characteristic.

The negative voltage for grid-bias supply is obtained from a full wave rectifier 238. Two voltage-regulating tubes 239 and 240 insure the stability of this voltage supply. Two leads, each at −150 volts, are used to supply the output network in each filter channel.

Three additional electronic voltage regulators, identified in their entireties as 241, 242, and 243, and identical in operation with the regulator above described, are connected in parallel with the first mentioned regulator. The one voltage regulator tube 235 serves all of these circuits.

*Main power supply*

The main power supply furnishes operating power for all units of the assembly with the exception of the filter channels and the cathode-ray oscillograph. It contains two full wave rectifiers, 250 and 251, one half-wave rectifier, 252, and three electronic voltage regulators. A positive 200-volt line is regulated by a circuit which includes tubes 253 and 254 and which functions in the same manner as the electronic regulator in the filter power supply. The bias on the screen grid of amplifier 253 is fixed by the resistance network 255, 256, and 257. And the resistance 258, in order to satisfy the condition that no direct current flow therethrough, is tied between resistors 255 and 256 at a point such that its potential is equal to the average potential of the cathode of tube 254. Resistor 258 is adjustable in order that the proper degree of compensation may be obtained.

A second electronic regulator, including tubes 260 and 261, supplies the positive 110-volt line. The cathode of the amplifier tube, 261 in this case, is grounded directly. Voltage regulator tubes 262 and 263 are provided, and these operate (for the apparatus described) between ground and −210 volts. Between these tubes, at a point of −105 volts potential, a lead is taken, and this lead supplies the reference voltage for the electronic regulator, and, by means of the resistance networks 264, 265, 266, and 267, 268, 269, the grid biases for the tubes.

A third electronic regulator, identical with the one just described, comprises tubes 270 and 271 and associated elements; this supplies a negative 100-volt source. The reference voltage for this current is −210 volts, and is obtained from the negative side of the voltage regulator tube 263.

These two circuits are the same as those already described except for minor differences occasioned by the different positions of the voltage regulator tubes in the circuits. The current through these tubes is obtained from the half-wave rectifier 252. Tubes 262 and 263 stabilize the negative side of this half-wave rectifier at −210 volts. The load variations on this grid supply line are not sufficient to require the use of an electronic voltage regulation.

The 3-volt A. C. signal used in the timing circuits is taken between one side of the 6.3-volt filament lead and ground.

VOLTAGE REGULATORS

Figure 14:
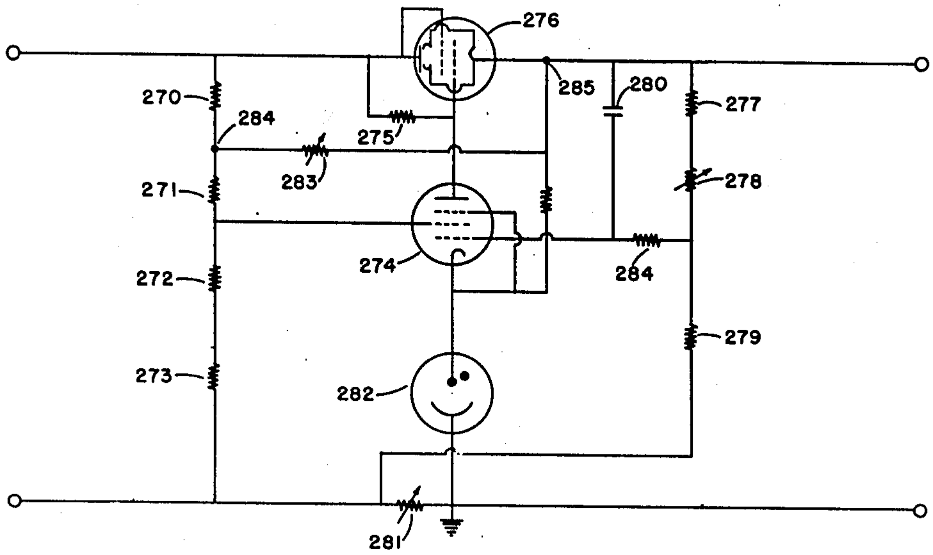
Figure 14 illustrates one form of the electronic voltage regulator of my invention.
Figure 15:
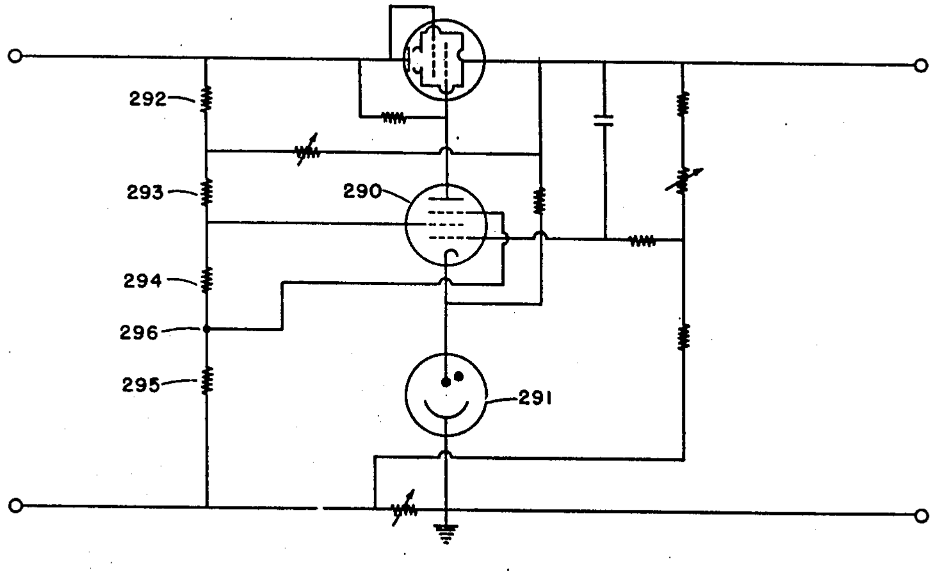
Figure 15 shows a modification of the voltage regulator of Figure 14.

In Figures 14 and 15 are shown electronic voltage regulators of my invention. The regulators of the two figures are similar, and both are somewhat like the regulators shown in Figures 12 and 13 and already described. There are important differences however.

These regulators are claimed in my divisional patent application S. N. 669,556, filed May 14, 1946.

Like the regulator of Figure 12, that of Figure 14 comprises a voltage dividing network, consisting of resistors 270, 271, 272, and 273, across the supply lines, and an amplifying pentode 274 the screen grid of which is varied in accordance with changes in input potential. A rise in screen grid potential, due to an increase in input, increases the current through the tube, and thereby enlarges the potential drop across its plate-load resistor 275. This action adds to the negative grid potential of the series-regulator tube 276, increasing the plate resistance. This operation controls the output potential of the regulator for changes in input potential.

Compensation of output potential for short-time and long-time variations in effective load-resistance also is provided for in novel manner. As explained in connection with the regulator of Figure 12, any short-time variation in load current is impressed on the control grid of amplifier 274 through the network including resistors 277, 278, 279 and condenser 280. 279 serves to determine the nominal output of the regulator. Short-time changes in load current cause potential changes which are coupled to the control grid of pentode 274 through condenser 280 and which are then compensated for as already described.

Any change in load current continuing for a period longer than that for which condenser 280 can maintain the change at the grid of the amplifier 274 will develop a change in potential across resistor 281, through which the plate current of the tube 274 and all load current passes. A change of this potential drop varies the cathode-to-control grid potential of tube 274 in the proper phase to oppose any change in the output potential of the regulator.

The magnitude of the potential drop across 281 is determined by adjustment of the resistance, and the value of resistance 281 at which neither overcompensation nor undercompensation will occur with changes in load current may be readily ascertained.

A gas-filled regulator tube 282 is used to raise the potential of the cathode of amplifier 274 with respect to ground potential. Since fluctuations of the operating potential of 282 will vary the grid-cathode potential of the regulator amplifier and therefore the output of the system, the selection of the tube 282 should take into account the ability of the tube to maintain its own operating potential. It has been found that a type VR-105/30 tube is to be preferred to a type CD-2005 in this connection. A battery may be substituted for the gas-filled tube, and will eliminate short-time fluctuations, but may introduce slow changes in the output due to the charging effect of the cathode current of the pentode 274.

In determining the point of connection of the screen grid of pentode 274 to the voltage dividing network 270, 271, 272, 273, it is necessary, in addition to obtaining the proper operating potential for the screen grid, to allow enough of the input fluctuation to appear on the screen grid that the regulator actually overcompensates therefor, before the resistance 283 is inserted in the circuit. A fall in input potential will, in other words, produce a slight rise in output potential.

After proportioning the resistance network so that the screen grid overcompensates for input variations, all traces of overcompensation are removed by the insertion and proper adjustment of the variable resistance 283. Resistance 283 must not carry any load current, and, to this end, it is positioned in the circuit so that points 284 and 285 are at the same average potential. Only voltage changes will then appear across resistor 283. This resistor, in series with the load resistance, and with point 285 maintained at output potential, forms a shunt for screen-signal potential across the lower portion of the voltage divider network comprising resistors 271, 272 and 273 in series. By adjustment of 283, the voltage change appearing at point 284, and therefore on the screen grid of pentode 274, may be attenuated. It is clear, then, that for some particular value of resistance 283, there will be no change in output due to changes in input. By proper adjustment of this variable resistance, therefore, changes in the plate resistance of tube 276 are caused to compensate exactly for changes in input voltage.

For some applications of the voltage regulator, compensation for long-time voltage variations may be of no importance. In such cases, variable resistor 281 may be omitted, as in Figures 12 and 13, and the regulator will then compensate only for supply potential variations and short-time load variations. It will still maintain the output reasonably constant for long-time variations, but the output can be expected to vary slightly with long-time load changes of the order of twenty per cent. Capacity 280 and resistor 284 should be retained, not only to provide short-time load compensation but to eliminate the fluctuations produced by the regulator tube 282, as already described.

The normal operating current of the screen grid of pentode 274 is drawn from the input through the voltage-divider network of resistances 270, 271, 272 and 273 in series. Any input variation will cause a change in the screen-grid current which will produce a potential drop across 270 and 271 in series tending to oppose the regulating action of the change in screen-grid potential. It is advisable, therefore, to keep the current in this bleeder network as high as possible, so that the degenerative effect of the change in screen current will remain at a minimum. With a two milliampere current, the regulator retains control over the circuit at full load with input variations of plus-or-minus forty percent; with a one milliampere current, plus-or-minus twenty per cent.

In Figure 15 is shown a modified voltage regulator adapted for higher output potentials than the regulators described. As the output potential is increased, it becomes more important that the electrodes of the regulator amplifier 290 in Figure 15, be operated as nearly as possible to the output potential. And it is then necessary properly to couple to the control electrodes input and output potential changes. The cathode of the amplifier may be operated at a higher potential from ground by using two tubes in series in place of the single voltage-regulator tube 291. This will, however, increase the difficulties growing out of the small, short-time fluctuations characteristic of gas-filled voltage-regulator tubes. A more desirable method is illustrated in Figure 15. The regulator-amplifier cathode-to-suppressor connection shown in Figure 14 is eliminated, and the suppressor grid of the tube is connected to the voltage-divider network 292, 293, 294, 295, as at 296. This connection allows the suppressor grid to exert some regulating action in conjunction with the screen grid when the attenuation ratio $$R_{294}+R_{295}/R_{292}+R_{293}+R_{294}+R_{295}$$

becomes so great—due to the necessity for operating the screen grid at its proper potential with respect to the cathode at high output values—that the amplification of the screen grid alone is not sufficiently high to control the plate current of the tube for proper regulation. The resistance network should be so designed that the potential at point 296 is essentially the same as that of the cathode of the amplifier 290.

OPERATION

The analyzer is designed to operate on 120-volt 60-cycle regulated power. It draws about 9 amperes at this voltage. The power factor of the analyzer is about 0.99.

Power is distributed to the various elements of the invention in accordance with the diagrammatic circuit drawings herein through any convenient arrangement of junction boxes; and connection is made to an oscillograph.

The voltage level of the input to the analyzer should be of the order of 0.1 to 1.0 volt. An attenuator or voltage divider should be provided in order to maintain the input signal voltage at this level.

The voltage supplies should be carefully adjusted to their proper values. Some convenient meters, as 300, 301, 302 and 303 (Figure 13) should be provided for this purpose. The meters illustrated indicate respectively the A. C. line voltage, 120-volts, the positive 200-volt plate supply, the positive 110-volt plate supply, and the negative 100-volt grid bias supply. The positive 200-volt, positive 110-volt and negative 100-volt supplies can be controlled and adjusted by the variable resistors 304, 268 and 305, respectively.

Six adjustments are provided for use in securing the proper pattern on the oscillograph screen. These may be conveniently termed Zero, Gain, Synchronizer, Phase, Frequency and Stabilizer; and they correspond respectively to the variable or adjustable resistors $180^3$ and 187 (Figure 10), and 214, 213, 193 and 196 (Figure 11).

The following procedure is suggested for setting up the pattern: all pattern controls are set at minimum, except the Zero control which is at maximum. The intensity and focus of the oscillograph are fixed at convenient levels; the "frequency" switch of this instrument is turned off; the Y-axis amplifier is at zero, and the X-axis amplifier is at 30.

With the power turned on, the X and Y position controls of the oscillograph are adjusted until a spot appears on the screen. This spot will repeatedly move horizontally across the screen. Adjustment of the Stabilizer control will produce a pattern of thirty spots in a horizontal line. Increase Gain until vertical lines appear, one above each of the thirty spots, to a convenient height, from one to three inches.

Preferably the Stabilizer setting is decreased until the pattern becomes unstable; and stability is reobtained by adjustment of the Synchronizer. This procedure is desirable, because otherwise the pattern may become stable with the line or "thermometer" at position 1 displaced from its proper position.

Adjust Frequency if any ripple appears in the pattern; and adjust Phase for maximum stability.

Decrease Zero until the right and left hand thermometers are just visible above the horizontal axis. The intermediate thermometers will in general have irregular heights. All controls except Gain are now correctly set. Minor adjustment of Frequency may be necessary occasionally if the pattern develops a ripple, i. e., a slight, recurrent shifting of the entire pattern across the screen of the oscillograph, which may be caused by spurious magnetic deflection of the electron beam when the frequency of the electronic switch differs slightly from that of the power-supply line.

Two controls for each filter channel are provided. These may be conveniently termed Balance and Gain Zero, and they are respectively the resistors 57 and 54 of the filter circuits (see Figure 3).

Increase Gain until the right and left hand thermometers are about 2½ inches high. With no signal on the analyzer input, adjust the twenty-eight Balance adjustments, in order of increasing frequency, until the twenty-eight intermediate thermometers have equal heights. The level of the two end thermometers is the zero signal level. While this adjustment is being made, all of the individual Gain Zero controls should be at zero. It should be noted that this adjustment is made at a high Gain setting. As a consequence a certain amount of fluctuation may occur in the height of the thermometers. This fluctuation may, in general, be disregarded. It should also be noted that the heights of the individual thermometers will vary slowly with time as the instrument warms up. To minimize this and similar effects, it is suggested that the analyzer be turned on at least an hour before accurate settings or measurements are made. After this adjustment has been made, return Gain to a standard setting.

Arrange a beat-frequency oscillator on the input of the analyzer in such a way that a signal of constant voltage and adjustable frequency can be applied to the instrument; the use of a vacuum-tube voltmeter across the input of the analyzer is suggested. Set the oscillator frequency at about 25 cycles. Adjust the oscillator voltage as read on the vacuum-tube voltmeter to 0.1 volt or some other convenient value. Adjust the low-pass Gain Zero control until the low-pass thermometer rises to 2 inches. Adjust the frequency of the oscillator to obtain the maximum deflection of the thermometer. Reset the oscillator voltage if necessary and readjust the low-pass Gain Zero control to obtain standard deflection of approximately 2½ inches.

The same general procedure should be followed for each of the tuned channels; namely, set the oscillator for the lower frequency of maximum response for the channel, adjust the oscillator voltage to the standard value (0.1 volt, R. M. S.) and adjust the Gain Zero control for the channel in question to obtain standard deflection of the corresponding thermometer. It should be noted that there is a small drop in response at the center of the frequency-response curve of each filter channel. The lower frequency of maximum response for each filter channel should be used for this adjustment.

The all-pass channel Gain Zero control should be adjusted in the same way except that a larger input voltage (0.2 or 0.4 volt) should be used in order to provide a condensed scale for the all-pass thermometer. The displacement of the all-pass thermometer is proportional to the sum of the displacements of the other thermometers.

In adjusting the Gain Zero controls, care should be exercised not to disturb the Balance controls of the various channels. After the Gain Zero adjustments have been made, the Gain and Gain Zero controls should not be disturbed.

The above description is specifically directed to the structure of the drawings. Many changes within the spirit of the invention will be obvious to those skilled in the art, however, and it is to be understood that the invention is not restricted in scope to the embodiment described and shown, but includes everything that properly falls within the appended claims.

The invention herein described may be manufactured and used by or for the Government of the United States of America for governmental purposes without the payment of any royalties thereon or therefor.

I claim:

1. An electronic switching circuit comprising a plurality of high-vacuum electron tubes arranged functionally in rows and columns, each of said tubes including an anode, a cathode and control electrode means, said tubes being normally in non-conducting conditions, means cooperating with said control electrode means of tubes in each row for partially biasing rows of tubes successively and cyclically, and means cooperating with said control electrode means of tubes in each column for partially biasing columns of tubes successively and in timed relation to the cyclic partial biasing operations of said first mentioned means, a tube being adapted to conduct when concurrently acted upon by the first mentioned means and the second mentioned means.

2. An electronic switching circuit comprising a plurality of high-vacuum electron tubes arranged functionally in rows and columns, each of said tubes including an anode, a cathode and first, second and third control electrodes, a plurality of gaseous discharge electron tubes adapted to be ignited and extinguished successively in recurring cycles and each having an electrode connected to said first control electrodes of a column of the first mentioned plurality of tubes to affect the conductivity thereof, a further plurality of gaseous discharge electron tubes adapted to be ignited and extinguished in succession in timed relation to the cyclic ignition and extinction of the second mentioned plurality of tubes each having an electrode connected to said second control electrodes of tubes of a row of the first mentioned tubes to affect the conductivity thereof, a plurality of input lines connected to said third control electrodes of the first mentioned tubes and an output line connected to an electrode of each of the said first-mentioned tubes.

3. An electronic switching circuit comprising a plurality of high-vacuum electron tubes arranged functionally in rows and columns, each of said tubes including an anode, a cathode and first, second and third control electrodes, means including said first electrodes for varying in prearranged order the conductivity of said rows of tubes successively and cyclically, means including said second electrodes for varying by columns the conductivity of said columns of tubes successively in timed relation to cyclic variations in conductivity of said rows, input lines connected to said third electrodes for applying separate voltages thereto, and a common output line connected to an electrode of each of said tubes.

4. A circuit comprising a plurality of high-vacuum electron tubes having first and second control electrodes, said tubes being arranged functionally in rows and columns, a plurality of gaseous discharge electron tubes adapted to be ignited and extinguished in predetermined order and each gaseous discharge tube having a given electrode the potential of which varies upon ignition of said tube, said given electrodes being each connected to said first control electrodes of tubes of a column of the first mentioned plurality of tubes, and a further plurality of gaseous discharge electron tubes adapted to be ignited and extinguished in predetermined order each of said last mentioned tubes having a given electrode the potential of which varies upon ignition of said tube, said last mentioned given electrodes being each connected to said second control electrodes of tubes of a row of the first mentioned tubes, a first mentioned tube being adapted to conduct only upon ignition of both tubes whose given electrodes are connected to its first and second control electrodes; and clipping means associated with said gaseous discharge tubes for limiting the voltages impressed on said first and second control electrodes.

5. The combination of a ring circuit comprising a plurality of trigger tubes each including a control electrode, means dependent upon the ignition of one of said tubes for extinguishing a previously ignited tube of said ring circuit and for partly priming another tube of said ring circuit to be fired successively, means dependent upon the ignition of any of said tubes, excepting said one, for extinguishing a previously ignited tube of said ring circuit and for fully priming another tube of said circuit, another ring circuit comprising a plurality of trigger tubes each including a control electrode, means dependent on the ignition of any one of the tubes of the second ring circuit for extinguishing a previously ignited tube of said second ring and for fully priming another tube thereof, an input line supplying successive pulses to the control electrodes of the tubes of said second ring, means for firing the tubes of the first mentioned ring in predetermined relation to those of the second mentioned ring including the control electrodes of all tubes of the first mentioned ring, and means for positively locking the rings in desired relation including a coupling between one of the tubes of the second mentioned ring and the partly primed tube of the first mentioned ring whereby to complete the priming of the said partly primed tube of the first mentioned ring circuit.

6. A ring circuit comprising a plurality of trigger tubes, means dependent upon the ignition of one of said tubes for extinguishing a previously ignited tube and for partly priming a tube to be fired successively, means dependent upon the ignition of any of said tubes, excepting said one, for extinguishing a previously ignited tube and for fully priming another tube to be next fired; and another ring circuit comprising a plurality of trigger tubes one of which tubes is adapted when ignited to complete the priming of the partly primed tube of the first mentioned ring circuit.

7. In a thyratron ring circuit comprising at least four tubes each having a control electrode, means dependent upon the ignition of one of said tubes for extinguishing a previously ignited tube and for priming another of said tubes to be next fired, an input line supplying successive pulses to said control electrodes, and means for inhibiting the simultaneous firing of more than one tube including a coupling between at least two non-adjacent tubes adapted upon the firing of one of said tubes to provide an extinguishing pulse to the other.

8. In a thyratron ring circuit comprising at least four tubes each having a control electrode, means dependent upon the ignition of one of said tubes for extinguishing a previously ignited tube and for priming another of said tubes to be next fired, an input line supplying successive pulses to said control electrodes, and means for inhibiting the simultaneous firing of more than one tube including a capacitative coupling between at least two non-adjacent tubes adapted upon the firing of one of said tubes to furnish an extinguishing pulse to the other.

9. In a circuit first and second thyratron ring circuits the first of which comprises at least four tubes including a tube having an electrode the potential of which changes upon ignition of said tube, means connecting said electrode with a tube of the second ring circuit to synchronize the firing of the rings and means for preventing the simultaneous firing of more than one tube of the first ring circuit, said means including a coupling between two non-adjacent tubes of the said first ring circuit adapted upon the firing of one of said coupled tubes to provide an extinguishing pulse to the other.

10. A circuit adapted to convert successive signals, each of substantially constant amplitude for its duration, the amplitude of successive signals being subject to variation, into successive pulses the amplitudes of which are proportionally related to the amplitudes of the signals, which comprises a high-vacuum electron tube having a cathode, a plate and a control electrode, a plate circuit and a source of plate current for the tube, a capacitor, a grid controlled gaseous discharge tube through which the capacitor is adapted to discharge upon ignition of said gaseous discharge tube, means for applying each signal to the control electrode of the high-vacuum electron tube, means for charging the capacitor substantially to the plate voltage of the high-vacuum electron tube during application of the signal to the control electrode thereof, and means for igniting said gaseous discharge tube substantially at the expiration of each signal.

11. A circuit adapted to convert a histogram signal into a series of pulses the amplitudes of which are proportionally related to the several steps of the histogram, said circuit comprising an electron tube having a control electrode, a capacitor, another tube through which the capacitor is adapted to discharge, means for applying the signal to the control electrode of said electron tube to cause currents to flow therethrough successively proportional to the successive steps of the histogram, means for charging the capacitor while each current is flowing to a voltage determined by said current, and means synchronized with the steps of the histogram for igniting the second mentioned tube substantially at the end of each step to cause the capacitor to discharge.

12. A circuit according to claim 11, further characterized by means for varying the bias of the first mentioned tube, whereby to vary the lower limit of said pulses without changing the relation between the amplitudes thereof.

13. Means for automatically starting and maintaining operation of a ring circuit, comprising an oscillator including a gas-filled oscillator tube having a control element, means normally biasing the control element whereby said oscillator will produce igniting pulses for the ring circuit sufficient to maintain operation of the ring but insufficient to initiate operation thereof and a capacitative coupling between the control element of said tube and a source of abnormal biasing voltage, the said coupling increasing the amplitude of the oscillations of said tube until the capacity is fully charged.

14. A circuit including a grid-controlled high-vacuum electron tube normally biased to prevent conduction therethrough, means including an oscillation generator connected to said grid for producing periodic current surges in said tube, a capacitor, a normally nonconducting grid-controlled gaseous discharge electron tube through which said capacitor is adapted to discharge, means for depositing on said capacitor during each of the said current surges a voltage determined by the magnitude of said surge, and counting means controlled by said oscillation generator and operative after a predetermined number of charges has been deposited on said capacitor to deliver a pulse to the grid of said gaseous discharge tube sufficient for tripping the last mentioned tube to discharge said capacitor.

15. A circuit adapted to maintain one frequency at a multiple of another frequency subject to instantaneous variations, said circuit comprising an oscillator including an electric discharge device having a non-reactive plate circuit including a plate resistor, said oscillator adapted to have its frequency varied by variation in the plate voltage, a high-vacuum electron tube having an anode, a cathode, a first control electrode and a second control electrode, means for impressing on the first control electrode of said tube voltage pulses at a rate proportional to the frequency of said oscillator and on the second control electrode other voltage pulses at a rate proportional to the frequency subject to instantaneous variations, the first-mentioned voltage pulses and said other pulses being opposite in sense and normally slightly out of phase with each other and being adapted to cause in said tube current surges the durations of which depend upon the phase difference, the instantaneous phase difference depending upon the instantaneous value of the frequency subject to variations, and means passing said current surges through said plate resistor for varying the plate voltage of the oscillator in accordance with the durations of said current surges.

16. In combination, a first ring circuit comprising a plurality of grid-controlled trigger tubes, means dependent on the ignition of at least one of said tubes for extinguishing a previously ignited tube and for fully priming a succeeding tube of said ring, means dependent on the ignition of another of said tubes for extinguishing a previously ignited tube and for only partly priming a succeeding tube of said ring circuit, means associated with the control grids of all of said tubes for igniting any one of said tubes in fully primed but not in partly primed condition including another ring circuit comprising a plurality of grid-controlled trigger tubes, means dependent on the ignition of any one of the tubes of said other ring circuit for extinguishing a previously ignited tube and for fully priming a succeeding tube of said other ring circuit, means associated with the control grids of all of the tubes of said other ring circuit for igniting any one of said tubes of said other ring circuit in fully primed condition, and means responsive to the ignition of one of the tubes of said other ring circuit for completing the priming of said partly primed tube.

17. A circuit adapted to maintain one frequency at a multiple of another frequency subject to instantaneous variations, said circuit comprising an oscillator including an electric discharge device having a non-reactive plate circuit including a plate resistor, the frequency of said oscillator varying with variations in the plate voltage, a mixer of the electron tube type having first and second control electrodes and an output circuit, means for impressing on said first control electrode voltage pulses at a rate proportional to the frequency of said oscillator and on said second control electrode other voltage pulses at a rate proportional to the frequency subject to instantaneous variations, the first-mentioned voltage pulses being normally slightly out of phase with said other voltage pulses whereby current surges the durations of which depend on the phase difference are produced in said mixer output circuit, the instantaneous phase difference depending on the instantaneous value of the frequency subject to variations, said mixer output circuit being connected between the plate resistor and the plate of said electric discharge device so that the plate voltage of the oscillator is varied in accordance with variations in duration of said current surges.

18. A circuit comprising a plurality of high-vacuum electron tubes each including an anode, a cathode and a control electrode, a plurality of gas tubes each including a plurality of electrodes one constituting an output electrode, said gas tubes being adapted for ignition and extinguishment in predetermined order and each having its output electrode connected to the control electrode of one of said high-vacuum tubes to affect the conductivity thereof, said gas tubes providing peaked output signals, and a plurality of signal clipping devices each connected to one of said output electrodes and each including oppositely polarized rectifiers one adapted to ground a portion of the output signal and another adapted to limit the value of another portion of said output signal.

19. A circuit comprising a plurality of high-vacuum electron tubes arranged functionally in rows and columns each of said tubes including electrodes functioning as an anode, a cathode, a first control electrode and a second control electrode, a plurality of gas tubes arranged functionally in a first ring and each comprising a plurality of electrodes including an output electrode, said first ring tubes being adapted for sequential operation and each having its output electrode connected to said first control electrodes of tubes in one of said columns to affect the conductivity thereof, another plurality of gas tubes arranged functionally in a second ring and each comprising a plurality of electrodes including an output electrode, said second ring tubes being adapted for sequential operation and each having its output electrode connected to said second control electrodes of tubes in one of said rows to affect the conductivity thereof, said first and second ring tubes providing peaked output signals, and a plurality of signal clipping devices each connected to the output electrode of one of said first and second ring tubes and each including oppositely polarized rectifiers one adapted to ground a portion of the output signal from said one ring tube and another adapted to limit the value of another portion of said output signal.

GEORGE W. COOK.

REFERENCES CITED

The following references are of record in the file of this patent:

UNITED STATES PATENTS

| Number | Name | Date |
|---|---|---|
| 1,769,060 | Hendry | July 1, 1930 |
| 1,928,093 | Coyle | Sept. 26, 1933 |
| 1,932,589 | Holden | Oct. 31, 1933 |
| 1,955,332 | Iams | Apr. 17, 1934 |
| 1,994,232 | Schuck | Mar. 12, 1935 |
| 2,120,884 | Brown, Jr. | June 14, 1938 |
| 2,146,576 | Haselton et al. | Feb. 7, 1939 |
| 2,146,862 | Shumard | Feb. 14, 1939 |
| 2,158,285 | Koch | May 16, 1939 |
| 2,159,790 | Freystedt et al. | May 23, 1939 |
| 2,171,614 | Wendt | Sept. 5, 1939 |
| 2,183,399 | Heising | Dec. 12, 1939 |
| 2,206,123 | Rinia et al. | July 2, 1940 |
| 2,209,507 | Campbell | July 30, 1940 |
| 2,210,394 | Braden | Aug. 6, 1940 |
| 2,224,909 | Hackley | Dec. 17, 1940 |
| 2,245,627 | Varian | June 17, 1941 |
| 2,272,070 | Reeves | Feb. 3, 1942 |
| 2,275,460 | Page | Mar. 10, 1942 |
| 2,294,942 | Varian et al. | Sept. 8, 1942 |
| 2,308,778 | Prince, Jr. | Jan. 19, 1943 |
| 2,342,753 | Pearson et al. | Feb. 29, 1944 |
| 2,384,379 | Ingram | Sept. 4, 1945 |
| 2,404,307 | Whitaker | July 16, 1946 |